United States Patent
Spector et al.

(10) Patent No.: US 10,930,157 B2
(45) Date of Patent: Feb. 23, 2021

(54) SYSTEMS AND METHODS FOR AUTOMATED REAL-TIME AND ADVISORY ROUTING WITHIN A FLEET OF GEOGRAPHICALLY DISTRIBUTED DRIVERS

(71) Applicant: Dropoff, Inc., Austin, TX (US)

(72) Inventors: Sean Edward Spector, Austin, TX (US); Richard Leu, Austin, TX (US); Algis Woss, Austin, TX (US); Christian Carollo, Austin, TX (US)

(73) Assignee: DROPOFF, INC., Austin, TX (US)

( * ) Notice: Subject to any disclaimer, the term of this patent is extended or adjusted under 35 U.S.C. 154(b) by 285 days.

(21) Appl. No.: 15/962,489

(22) Filed: Apr. 25, 2018

(65) Prior Publication Data
US 2018/0315319 A1 Nov. 1, 2018

Related U.S. Application Data

(60) Provisional application No. 62/490,368, filed on Apr. 26, 2017.

(51) Int. Cl.
| | |
|---|---|
| *G08G 1/00* | (2006.01) |
| *G08G 1/01* | (2006.01) |
| *G01C 21/34* | (2006.01) |
| *G06Q 10/06* | (2012.01) |
| *G06Q 50/28* | (2012.01) |
| *G06Q 10/04* | (2012.01) |
| *G06Q 10/08* | (2012.01) |
| *G09B 29/00* | (2006.01) |

(52) U.S. Cl.
CPC ........... *G08G 1/202* (2013.01); *G01C 21/343* (2013.01); *G01C 21/3407* (2013.01); *G06Q 10/047* (2013.01); *G06Q 10/06316* (2013.01); *G06Q 10/063114* (2013.01); *G06Q 50/28* (2013.01); *G08G 1/0104* (2013.01); *G01C 21/3492* (2013.01); *G06Q 10/08* (2013.01); *G09B 29/007* (2013.01)

(58) Field of Classification Search
CPC ................ G08G 1/202; G08G 1/0104; G06Q 10/06316; G06Q 50/28; G06Q 10/063114; G06Q 10/047; G06Q 10/08; G01C 21/343; G01C 21/3407; G01C 21/3492; G09B 29/007
See application file for complete search history.

(56) References Cited

U.S. PATENT DOCUMENTS

| | | | |
|---|---|---|---|
| 5,880,958 A * | 3/1999 | Helms ..................... | G08G 1/202 340/991 |
| 2002/0019759 A1* | 2/2002 | Arunapuram .......... | G06Q 10/04 705/7.26 |

(Continued)

*Primary Examiner* — Jeff A Burke
*Assistant Examiner* — Kyle T Johnson
(74) *Attorney, Agent, or Firm* — Sprinkle IP Law Group

(57) ABSTRACT

Embodiments of systems and methods for automated real-time routing within a fleet of geographically distributed drivers are disclosed. Embodiments may operate to dispatch orders and determine routing in real-time in a geographic area through application of rule-based filtering of drivers and selective application of optimal or non-optimal routing solutions utilizing the real-time locations of drivers, real-time conditions within the geographic area and the locations for the set of orders being routed by the system.

14 Claims, 12 Drawing Sheets

(56) References Cited

U.S. PATENT DOCUMENTS

| | | | |
|---|---|---|---|
| 2005/0114190 A1* | 5/2005 | Pandit | G06Q 10/047 705/7.26 |
| 2007/0208492 A1* | 9/2007 | Downs | G08G 1/0104 701/117 |
| 2011/0224893 A1* | 9/2011 | Scofield | G08G 1/052 701/119 |
| 2014/0229258 A1* | 8/2014 | Seriani | G06Q 10/08345 705/14.23 |
| 2015/0081399 A1* | 3/2015 | Mitchell | G08G 1/0129 705/7.38 |
| 2015/0339923 A1* | 11/2015 | Konig | H04L 67/12 701/522 |
| 2016/0364812 A1* | 12/2016 | Cao | G06Q 50/30 |
| 2017/0220966 A1* | 8/2017 | Wang | G06Q 10/0639 |
| 2018/0012151 A1* | 1/2018 | Wang | G06Q 10/0639 |
| 2018/0018619 A1* | 1/2018 | Kisiler | G01C 21/3453 |
| 2018/0020951 A1* | 1/2018 | Kaifosh | A61B 5/04012 607/48 |
| 2018/0074493 A1* | 3/2018 | Prokhorov | G08G 1/0969 |
| 2018/0268370 A1* | 9/2018 | Fallah | G01C 21/343 |
| 2018/0315319 A1* | 11/2018 | Spector | G06Q 50/28 |

* cited by examiner

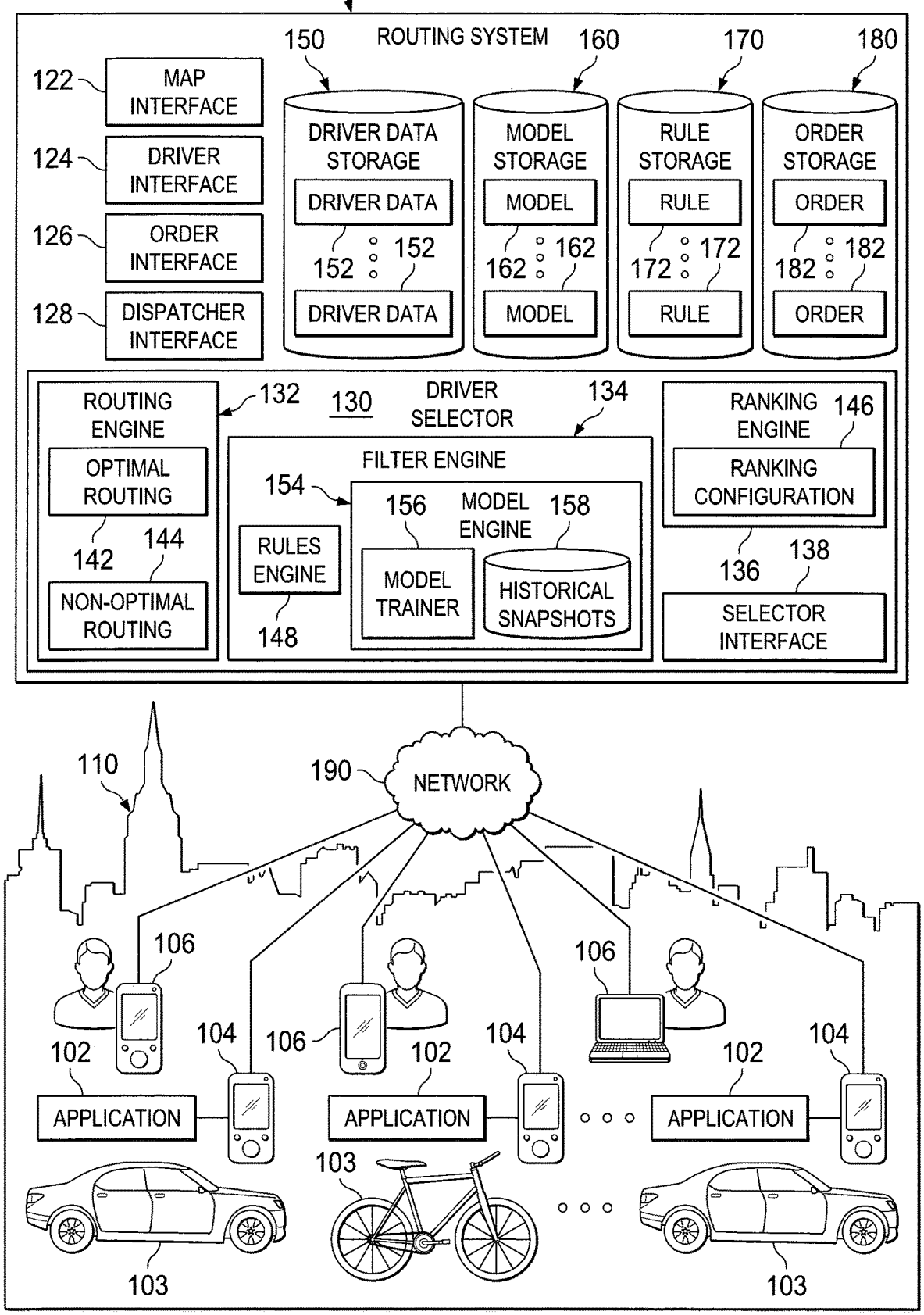

SYSTEMS AND METHODS FOR AUTOMATED REAL-TIME AND ADVISORY ROUTING WITHIN A FLEET OF GEOGRAPHICALLY DISTRIBUTED DRIVERS

RELATED APPLICATIONS

This application claims a benefit of priority under 35 U.S.C. § 119(e) to U.S. Provisional Patent Application Ser. No. 62/490,368, filed Apr. 26, 2017, entitled "SYSTEMS AND METHODS FOR AUTOMATED REAL-TIME AND ADVISORY ROUTING OF ORDERS WITHIN A FLEET OF GEOGRAPHICALLY DISTRIBUTED AGENTS" by inventors Carollo et al, which is incorporated herein in its entirety by reference.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

Embodiments disclosed herein are related to systems and methods for the distribution of orders for an on-demand service to a fleet of geographically distributed providers of the service. Even more specifically, embodiments presented herein pertain to systems and methods for the automated real-time assignment of orders for an on-demand service to a fleet of geographically distributed providers of the service based on time or geography related constraints, or other types of constraints.

BACKGROUND

Traditionally, same day delivery was reserved for time critical items. In many cases, a courier or messenger was assigned a single order (e.g., a request for delivery of an item having an origination location and a destination location and possibly a corresponding pick-up time window or delivery time window) and completed this order. The courier or messenger could then serially be assigned another order. In today's world, the ever increasing prevalence of on-demand services and ready and instant access to a variety of services and goods has driven the desire for instant gratification with respect to those goods and services. In the physical world, these desires have translated into an increasing need for same day delivery services.

No longer is same day delivery reserved for time critical items; the use of same day delivery has spread into almost all facets of society. With the increase in use of same day delivery, the same day delivery model has changed. No longer are single orders serially assigned to individual messengers or couriers. Instead, same day delivery services may utilize a number of independent delivery drivers distributed in a geographic area (e.g., also referred to as a market) to make deliveries within the geographic area via a transport mechanism such as independently operated motorized vehicles (e.g., car or motorcycle), bicycle, walking, public transport or some other transport mechanism or combination of transport mechanism.

Each delivery driver associated with a delivery company or service (referred to herein interchangeably as a delivery service or delivery company) is typically equipped with a mobile device such as a smart phone or personal data assistant, which may be a general purpose device or proprietary to a delivery company or service. Orders for the same day delivery may be received (e.g., at a system associated with a delivery company or service). The order can then be assigned or dispatched (used here interchangeably) by the delivery service system to one of these delivery drivers and the assigned delivery driver notified through their mobile device that they have been assigned the order. The order can then be tracked through delivery by the delivery service system.

As may be realized from the above description, these same-day delivery companies may face scaling problems around dispatching these orders. These scaling problems usually come in two basic forms. The first is knowledge of a locality's (market's) roads and traffic patterns. The second problem is the ability to apply the former knowledge, if available, to the ever-growing problem of distributing increasing volume of orders to an expanding fleet of delivery drivers during a particular time window in real-time.

The second problem is particularly problematic as the assignment of orders to drivers usually involves the determination of routes that drivers may take either based on the order to be assigned, orders previously accepted by a driver, or both. These routing determinations are further complicated by real-time traffic or other conditions in the market and any time windows associated with the orders or a driver's work schedule. While several software solutions that can solve generic textbook routing problems such as the Traveling Salesman Problem, Vehicle Routing Problem, and Pickup and Delivery Problem exist, none of these solutions are adequate for real-time dispatching of orders in an environment including constantly moving, geographically distributed drivers handling multiple orders during what may be multiple time windows. In the main, this is because such solutions are too slow to be utilized in a real-time environment with the type of variables previously discussed. The number of permutations of possible routes and other variables, including real-time conditions or the like, makes the use of such solutions prohibitively slow.

In some cases, using such solutions for order distribution when a large volume of orders and multiple delivery drivers are involved requires time on the order of weeks, months, years or longer. For example, typical vehicle routing approach to solve these types of problems may formulate a multiple driver pickup and delivery with time windows integer programming problem (MPDTWP in operations research literature). This formulation would optimize either the sum of all route durations or the maximum duration of all routes. This approach does not scale well and is only practical when the number of drivers is less than 5 and the number of total locations is less than 45. Otherwise, the time frame may be on the order of those mentioned above: weeks, months or years. These time frames are obviously unacceptable in the context of real-time on demand delivery service.

Moreover, existing solutions are largely incapable of obtaining and handling real-time traffic or other conditions and integrating these conditions in their routing solutions. In addition, existing solutions are highly inflexible in their outputs, usually providing only a single optimal solution without any insight into the other solutions (e.g., a qualitative or quantitative measure of how various possible alternative solutions may differ from the single optimal solution).

The use of humans in such scenarios is likewise inadequate. A single human or multiple humans cannot deal with the volume of orders in a market. It is a mental impossibility for humans to dispatch the volume of orders to a number of drivers in a market in the time frame (real-time) needed to actually implement a delivery service. Additionally, the use of humans to dispatch or assign incoming orders to drivers based on their physical location and the number of orders already assigned to these drivers actually cannot scale; once a certain number of humans dispatchers are reached for the market, the atomicity of each human's interactions with the drivers and that human's assignment of orders actually impedes the ability of the other human dispatchers to route or assign orders. As more orders are placed, the problem space becomes bigger for these humans, but the time window for making decisions on routing and assignment grows smaller, leading to even worse decisions and greater inefficiencies.

What is desired then, are systems for the real-time automated distribution of delivery orders to drivers distributed across a geographic area that may account for a driver's current work load, the specifics of the orders in the market, conditions in the market or other criteria.

SUMMARY

To remedy these problems, among others, attention is now directed to embodiments of a routing system for automated real-time distribution of delivery orders to drivers distributed across a geographic area. Embodiments may operate to dispatch orders in real-time to drivers by reducing the generic routing problem. In particular, embodiments may utilize the locations (e.g., originating or destination location of orders or locations of drivers) and state of orders (e.g., assigned drivers or other information) to perform a rule-based filtering of the potential drivers that may be assigned to a received order. Routes thus only need to be calculated for a reduced set of drivers to determine a candidate driver for assigning the order. By reducing the set of possible drivers, the number of routes and other conditions (e.g., real-time traffic conditions, time windows, etc.) that must be accounted for is reduced, in turn reducing the computation time needed to calculate a solution. Moreover, during the routing determination for the reduced set of drivers, non-optimal routing solutions may also be utilized to further reduce the computation time. Once routes are built, real-time traffic conditions may be taken into account to determine the duration of each leg of the routes. Finally, each potential driver may be ranked based on the duration of the determined routes.

In certain embodiments, then, the delivery service system may employ three layers: filter, route, and rank. Each layer is built in a flexible manner and may employ engines that operate according to machine learning algorithms. This flexibility allows for continual fine tuning of dynamic real-time conditions (e.g., conditions in the geographic area) and variability in demand. In addition, the flexibility allows for incremental improvements in specific areas such as route building or filtering. The layers of the delivery service system may be implemented independently for at least these reasons.

Specifically then, in certain embodiments the filter layer may operate to remove drivers who may have a relatively low possibility or probability of being a good or best driver to assign. The route layer may build optimal or pseudo-optimal routes to determine the total duration of the remaining (reduced set of) drivers' orders both without the order assigned to the driver and with the order assigned to the driver, and similarly the burden of assigning the received order to each of the remaining (reduced set of) drivers. The route layer may account for real-time conditions (such as traffic) when making this determination. To this end, the route layer may build or evaluate two optimized or pseudo-optimal routes for each driver. The rank layer may rank the remaining (reduced set of) drivers based on the burden or total duration(s) calculated by the route layer. This ranking, along with burden and duration, can be used to automatically select the highest ranking driver and assign the order to this highest ranking driver. Alternatively, the rankings may be presented through an interface (along with possibly other information such as the total duration(s) or burden) such that a user may utilize the ranking or other data presented in the interface to select a driver based on the presented data and assign the order to the selected driver.

In one embodiment, a system for real-time route determination and assignment of orders within a fleet of geographically distributed drivers includes a data store including driver data for each of a set of drivers physically distributed across a geographic area. Each of the drivers may have a computing device adapted to determine a current location of the driver. These system may include instructions for obtaining a current location for each of the set of drivers, wherein obtaining the current location for a driver comprises receiving the current location of the driver from the computing device of the driver. When the location for a driver is received, the system may update the current location for each of the set of drivers in the driver data.

Embodiments of the system may also receive a new order, the order comprising a pick-up location and a destination location in the geographic area. The system can assign the new order to one of the geographically distributed drivers by filtering the set of drivers to determine a reduced set of drivers by applying a filtering model trained on historical order data to the set of drivers to determine the reduced set of drivers with the highest likelihood of being a best driver for the new order and determining a burden for each driver of the reduced set of drivers.

Determining a burden for the driver may include determining a current set of orders for the driver; determining if a first number of locations in the current set of orders for the driver is greater than a threshold and determining a first total duration for the current set of orders for the driver by determining a first route for the current set of orders based on the driver's current location. The first route comprises a first set of legs and is determined by an optimal routing engine when the first number of locations is less than a threshold and a non-optimal routing engine when the first number of locations is greater than a threshold. A current travel time for each of the first set of legs is determined, and based on the current travel times for each of the set of legs a first total duration for the current set of orders can be determined.

Determining a burden for the driver may also include determining a combined set of orders for the driver by adding the new order to the current set of orders for the driver; determining if a second number of locations in the combined set of orders for the driver is greater than the threshold; and determining a second total duration for the combined set of orders for the driver by determining a second route for the combined set of orders based on the driver's current location. The second route comprises a second set of legs and is determined by an optimal routing engine when the second number of locations is less than a threshold and a non-optimal routing engine when the second number of locations is greater than a threshold. A current travel time for each of the second set of legs is determined, and based on the current travel times for each of the set of legs a second total duration for the combined set of orders can be determined.

The burden for the new order for the driver can be determined based on the first total duration for the current set of orders and the second total duration for the combined set of orders. Based on the burden for the new order determined for each of the reduced set of drivers, the reduced set of drivers can be ranked and the new order assigned to a highest ranking driver of the reduced set of drivers.

In some embodiments, the data store of the system includes order data comprising pick-up order entries and destination order entries for received orders, each order associated with a pick-up order entry and destination order entry. The driver data for each of the set of drivers can also include a list of pick-up order entries and destination order entries sorted to represent a current route determined for that driver. In a particular embodiment, the first route determined for the current set of orders is the current route.

In a specific embodiment, assigning the new order to the highest ranking driver comprises inserting a pick-up order entry and destination order entry into the list of pick-up order entries and destination order entries of the driver data for the highest ranking driver and re-sorting the list to represent the second route determined for the highest ranking driver.

In another embodiment, determining a current travel time for the first set of legs and the second set of legs comprises requesting the current travel time for each leg from a provider over a network.

In one embodiment, filtering the set of drivers to determine a reduced set of drivers comprises applying a set of filtering rules before applying the filtering model and wherein the filtering model is a recurrent neural network model trained on a set of historical snapshot of previously completed orders.

In a particular embodiment, determining the first total duration for the current set of orders comprises determining any non-transit time required at each destination of each of the set of legs of the first route and adding the determined non-transit time to the current travel times for each of the set of legs of the first route and determining the second total duration for the combined set of orders comprises determining any non-transit time required at each destination of each of the set of legs of the second route and adding the determined non-transit time to the current travel times for each of the set of legs of the second route.

Accordingly, embodiments as presented herein may offer a number of advantages. For example, embodiments as disclosed herein may be able to handle real-time on-demand pickup and delivery routing problems in an out-of-the box manner. Moreover, embodiments, may account for actual real-world dynamic conditions within the geographic area within which the drivers are distributed and within which the orders are being assigned. Such embodiments may reduce the processing overhead and computing resources required for such determinations by reducing or filtering the set of drivers that need to be valuated and utilizing non-optimal routing solutions in certain embodiments to determine which driver to assign to an order. These capabilities allow for optimal (or near optimal) solutions to such problems to be found and delivered in a timely manner. In fact, utilizing certain embodiments, it has been shown that an average time for assignment of a newly received order is on the order of two and a half seconds or less. This assignment time may include the fetching of real-time condition data from a third party provider over a network, which may be a large portion of such determination time. This time frame is within the real-time requirement necessitated by modern computer networks, user expectations and the requirements of a real-world order assignment and routing system. Additionally, these solutions may be determined as a set of ranked alternatives that quantify how much better (or worse) the set of ranked drivers are relative to one another. The rankings can thus be used to automatically select a driver to assign an order, determine a fallback order for the ranked set of drivers, or be presented to a user for the user's use in making a selection of a driver for order assignment.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 1 is a block diagram of one embodiment of a routing system for the automated real-time routing or assignment of orders within a fleet of geographically distributed drivers.

Figure 4A:
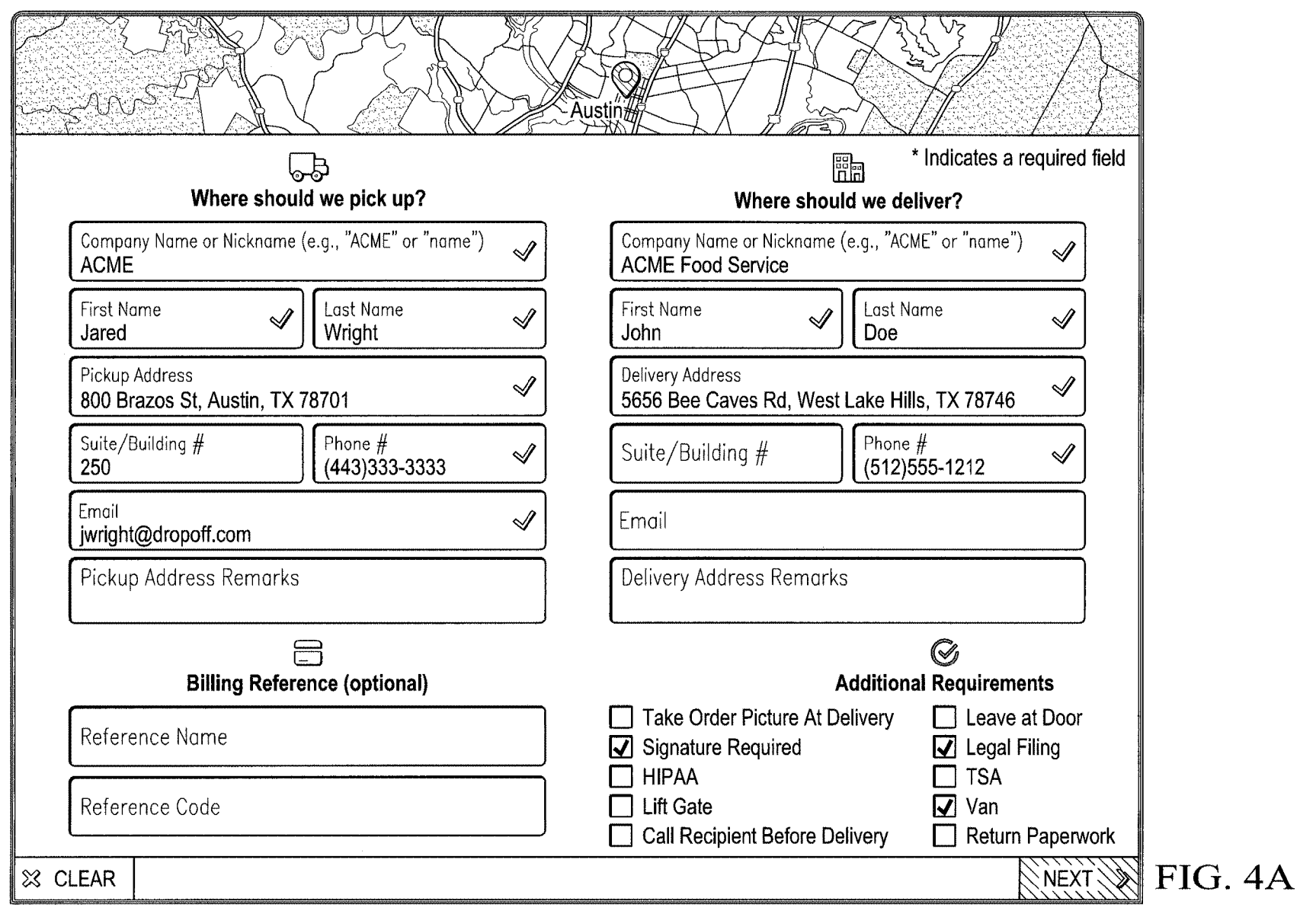
Figure 4B:
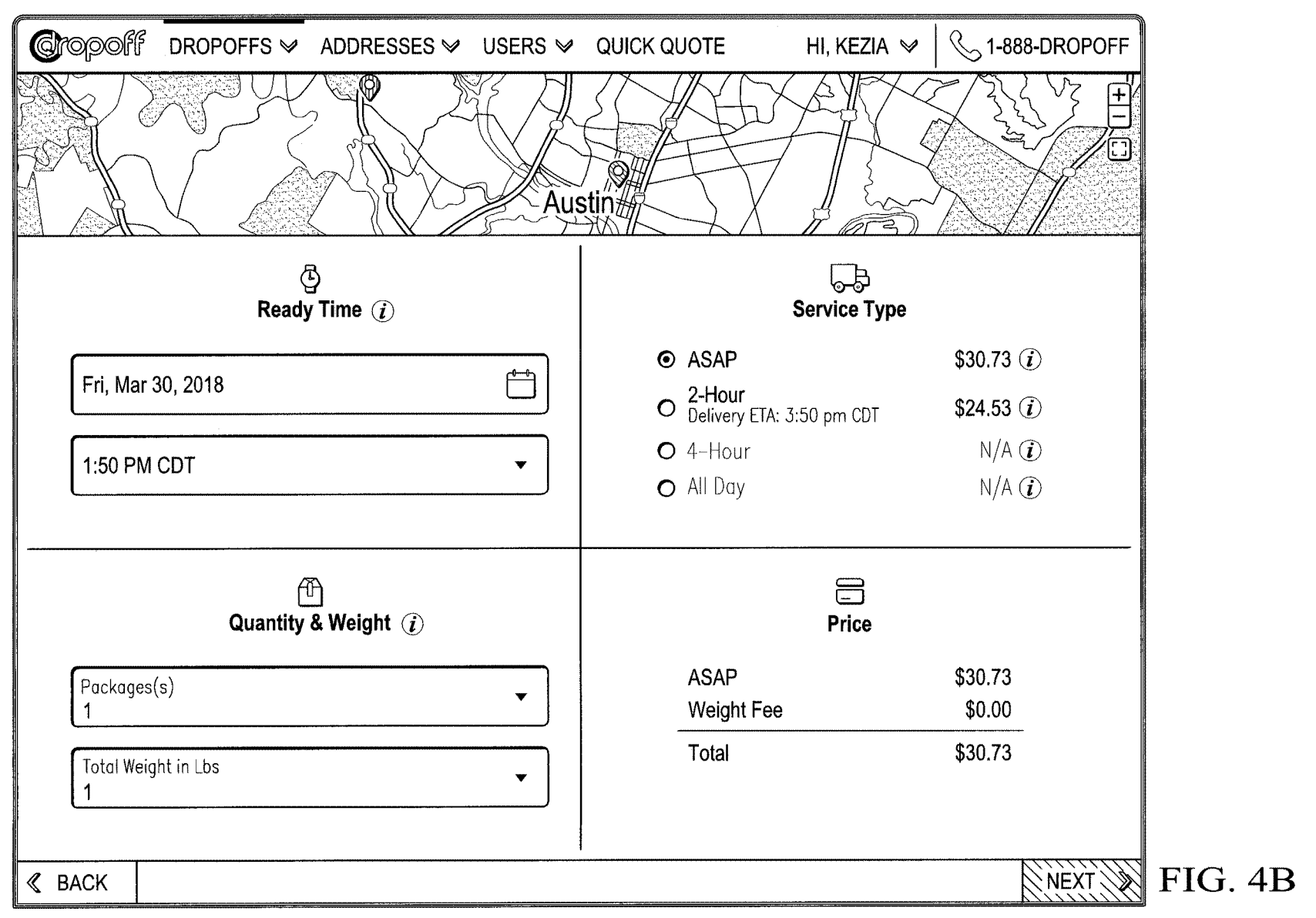
Figure 4C:
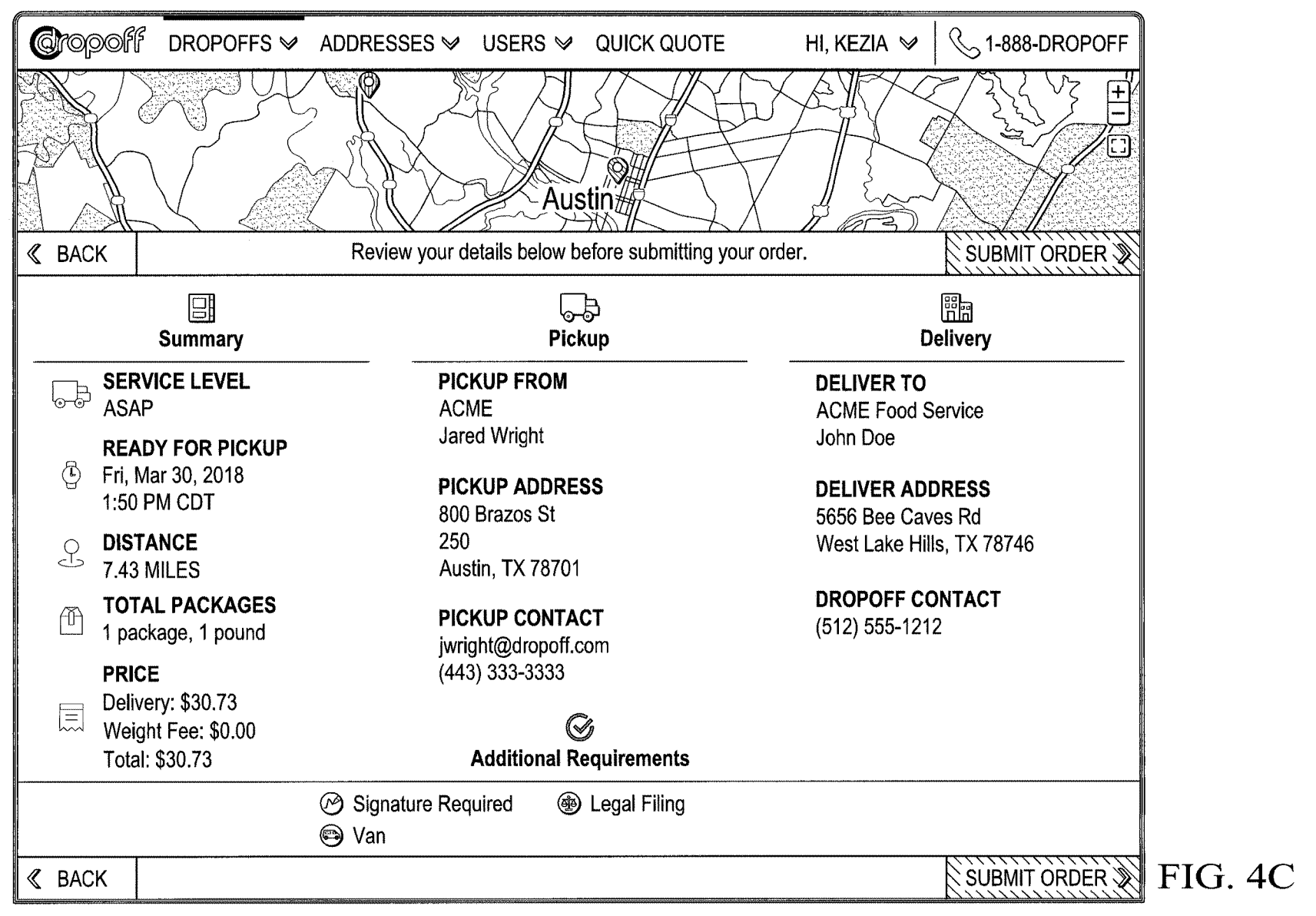
Figure 4D:
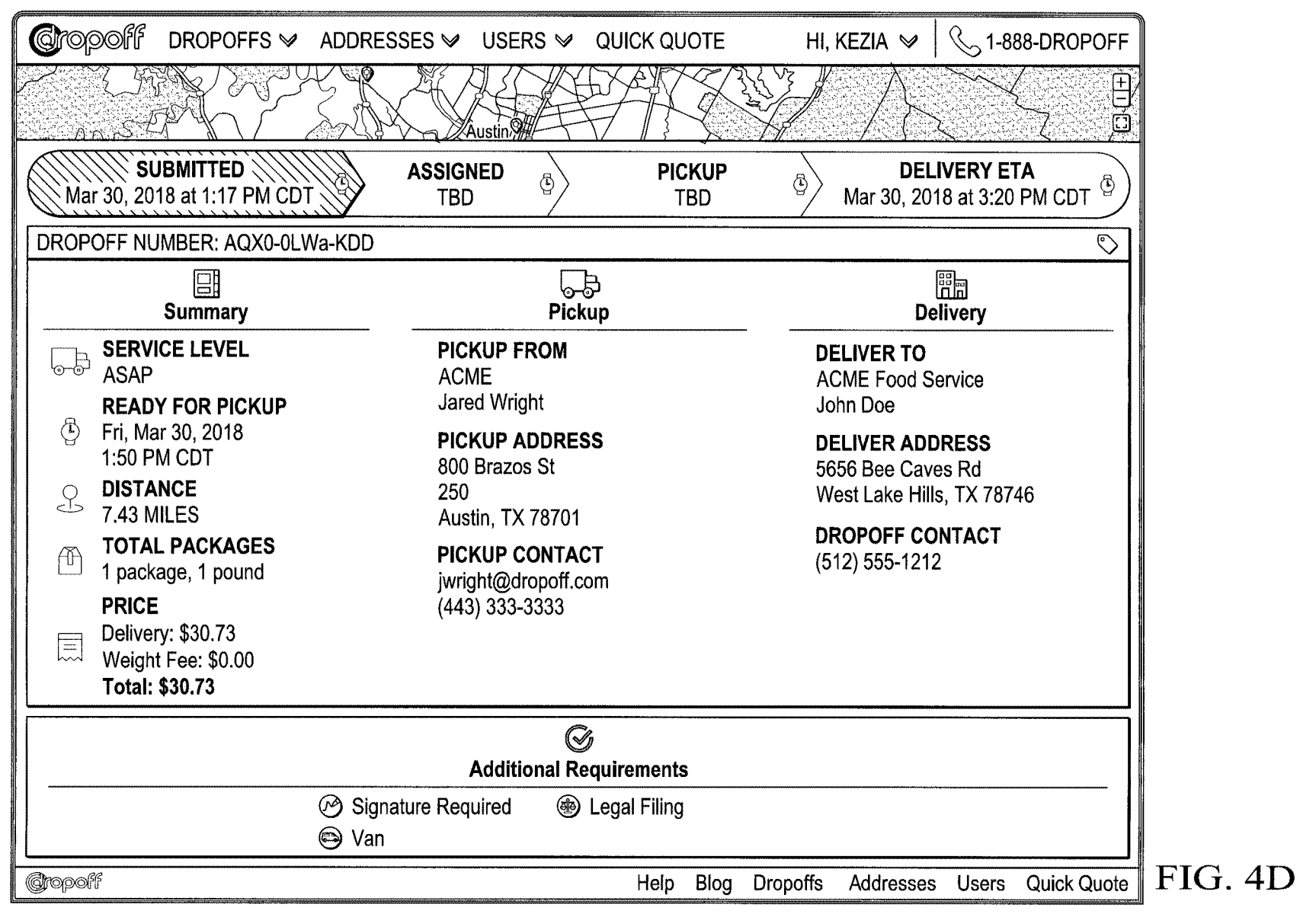

FIGS. 4A-4D depict embodiments of interfaces that may be used to submit an order to a routing system.

DETAILED DESCRIPTION

Figure 2A:
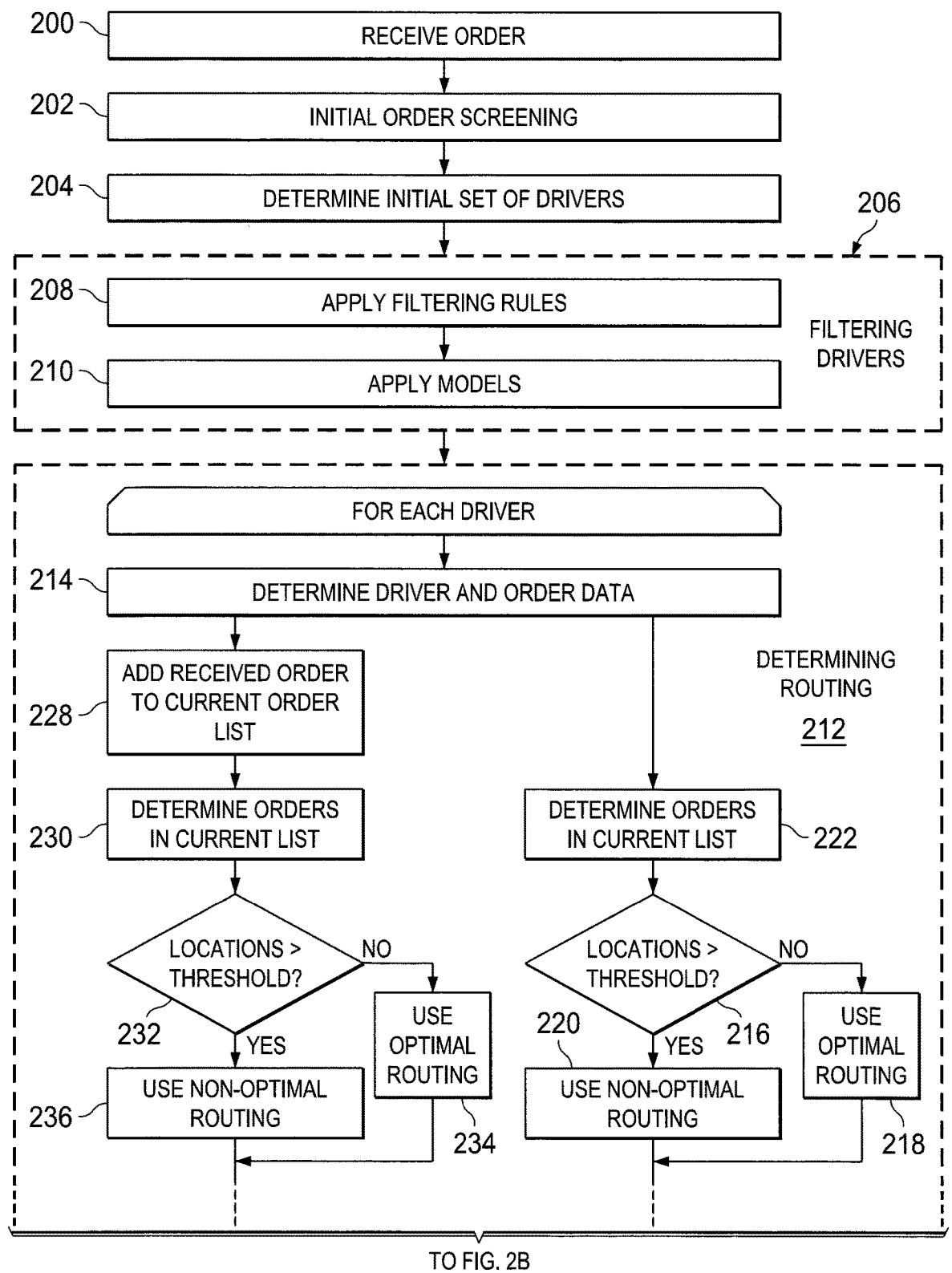
FIGS. 2A and 2B are flow diagrams of one embodiment of a method for selecting a driver for an order.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, some context may be useful. As discussed, traditionally, same day delivery was reserved for time critical items. However, the increasing desire for instant gratification has driven a commensurate increasing need for same day delivery services. Accordingly, no longer is same day delivery reserved for time critical items; the use of same day delivery has spread to almost all facets of society. Same day delivery services may utilize a number of independent delivery drivers distributed in a market to make deliveries within the geographic area via a transport mechanism such as independently operated motorized vehicles (e.g., car or motorcycle), bicycle, walking, public transport or some other transport mechanism or combination of transport mechanism.

Each delivery driver associated with a delivery service is equipped with a mobile device such as a smart phone or personal data assistant. Orders for same day delivery may be received by the delivery service. The order can then be assigned by the delivery service system to one of these delivery drivers and the assigned delivery driver notified through their mobile device that they have been assigned the order. The order can then be tracked through delivery by the delivery service system. In most cases, then, each delivery driver has a queue of orders to deliver at a given point in time, and will be routed through the market based on a number of criteria, including the origination location and destination of each of that driver's assigned orders.

As may be realized from the above description, these same-day delivery companies may face scaling problems around dispatching these orders. These scaling problems usually come in two basic forms. The first is knowledge of a locality's (market's) roads and traffic patterns. The second problem is the ability to apply the former knowledge, if available, to the ever-growing problem of distributing an increasing volume of orders to an expanding fleet of delivery drivers during a particular time window in real time.

The second problem is particularly problematic as the assignment of orders to drivers usually involves the determination of routes that drivers may take either based on the order to be assigned, orders previously accepted by a driver and in that driver's order queue, or both. These routing determinations are further complicated by real-time traffic or other conditions in the market and any time windows associated with the orders, or a driver's work schedule. Current software solutions are too slow to be utilized for order assignment to delivery drivers in a real-time environment with the type and number of variables previously discussed. As but one example, the number of permutations of possible routes and other variables, including real-time conditions or the like, make the use of such solutions prohibitively slow.

Moreover, the use of humans in such scenarios to perform such order assignment and routing in real-time is likewise inadequate. A single human or multiple humans cannot deal with the volume of orders in a market. It is a mental impossibility for humans to dispatch the volume of orders to a number of drivers in a market in the time frame (real-time) needed to actually implement a delivery service. Additionally, the use of humans to dispatch or assign incoming orders to drivers based on their physical location and the number of orders already assigned to these drivers actually cannot scale; once a certain number of humans dispatchers are reached for the market, the atomicity of each human's interactions with the drivers and that human's assignment of orders actually impedes the ability of the other human dispatchers to route or assign orders. As more orders are placed, the problem space becomes bigger for these humans, but the time window for making decisions on routing and assignment grows smaller, leading to even worse decisions and greater inefficiencies.

To remedy these problems, among others, attention is now directed to embodiments of a routing system for automated real-time distribution of delivery orders to drivers distributed across a geographic area. Embodiments may operate to dispatch orders in real-time to drivers by reducing the generic routing problem. In particular, embodiments may utilize the locations (e.g., originating or destination location of orders or locations of drivers) and state of orders (e.g., assigned drivers or other information) to perform a rule-based filtering of the potential drivers that may be assigned to a received order. Routes thus only need to be calculated for a reduced set of drivers to determine a candidate driver for assigning the order. By reducing the set of possible drivers, the number of routes and other conditions (e.g., real-time traffic conditions, time windows, etc.) that must be accounted for is reduced, in turn reducing the computation time needed to calculate a solution. Moreover, during the routing determination for the reduced set of drivers, non-optimal routing solutions may also be utilized to further reduce the computation time. Once routes are built, real-time traffic conditions may be taken into account to determine the duration of each leg of the routes. Finally, each potential driver may be ranked based on duration of the determined routes.

In certain embodiments, then, the delivery service system may employ three layers: filter, route, and rank. Each layer is built in a flexible manner and may employ engines that operate according to machine learning algorithms. This flexibility allows for continual fine tuning of dynamic conditions (e.g., conditions in the geographic area) and variability in demand. In addition, the flexibility allows for incremental improvements in specific areas such as route building or filtering. The layers of the delivery service system may be implemented independently for at least these reasons.

Specifically then, in certain embodiments, the filter layer may operate to remove drivers who may have a relatively low possibility or probability of being a good or best driver to assign. The goal of the filter layer is to remove drivers with a low probability of being the right driver for the new order to produce a reduced set of drivers (e.g., a number smaller than all drivers).

The route layer may build optimal or pseudo-optimal routes to determine the total duration of the remaining (reduced set of) drivers' orders both without the order assigned to the driver and with the order assigned to the driver, and similarly the burden of assigning the received order to each of the remaining (reduced set of) drivers. The goal of the route layer may be to determine the burden of adding the new order to the remaining drivers and to account for real-time conditions (such as traffic) when making this determination. To this end, the route layer may build or evaluate two optimized or pseudo-optimal routes for each driver: one route with the current set of orders and one route with the new order assigned to the current orders of the driver. The use of optimized or pseudo-optimized routing may be determined based on the number of orders assigned to the driver.

These optimal or pseudo-optimal routes may be built using, for example, commercial generic optimizers (e.g., Gurobi, CPLEX); open-source generic optimizers (e.g., GLPK (GNU Project), COIN-OR/SYMPHONY), optimization tools (e.g., Google Optimization Tools, OptaPlanner) or other routing tools (e.g., Google Maps Directions, Grasshopper, OptiMap, Routist, Open Door Logistics). Other ways of building optimal or pseudo-optimal routes may be utilized and are fully contemplated herein.

The rank layer may rank the remaining (reduced set of) drivers based on the burden or total duration(s) calculated by the route layer. This ranking, along with burden and duration, can be used to automatically select the highest ranking driver and assign the order to this highest ranking driver. Alternatively, the rankings may be presented through an interface (along with possibly other information such as the total duration(s) or burden) such that a user may utilize the ranking or other data presented in the interface to select a driver based on the presented data and assign the order to the selected driver.

Accordingly, embodiments as disclosed herein may be able to handle real-time on-demand pickup-and-delivery routing problems in an out-of-the box manner, allowing for optimal (or near optimal) solutions to such problems to be found and delivered in a timely manner. Moreover, these solutions may be determined as a set of ranked alternatives that quantify how much better (or worse) the set of ranked drivers are relative to one another. The rankings can thus be used to automatically select a driver to assign an order, determine a fallback order for the ranked set of drivers, or be presented to a user for the user's use in making a selection of a driver for order assignment.

For on-demand routing, embodiments may be able to formulate problems in real-time as orders come in. In addition, depending on the status of the order, this may contribute one location like vehicle routing problem or two locations like pickup-and-delivery problems. Part of this computation in the route layer includes the ability to quickly formulate the problem, an ability that is currently unavailable. Embodiments as disclosed may thus be more efficient at least because the filtering layer reduces the number of drivers (in some embodiments using machine learning techniques) prior to route building, pseudo-optimal route building may be utilized in certain cases for some drivers, and because performing N single driver optimization problems is less computationally expensive than 1 multiple driver optimization problem.

Accordingly, embodiments may solve the problems of traditional multiple vehicle routing including providing no information regarding next best drivers and lack of flexibility in optimization criterion. In particular, embodiments as disclosed herein may encompass flexible decision metrics and potentially complex rankings; the use of flexible modules where each module can act independently and modules can be mixed and match to meet specific market needs; and flexible usage by providing ranking outputs that allow for both automated and advisement usage.

Moreover, and importantly, the routing decisions and driver assignments made by embodiments are not made in a vacuum. Instead, they are made in a dynamic, real-time environment where each routing or driver assignment decision may impact future decisions in real-time as the orders are being received. Thus, the routing decisions and driver assignment for each order is made based upon the instantaneous specific context existing at that specific moment in time (e.g., number of drivers, driver's orders, current travel times, etc.). This context will change in real-time such that the context used to evaluate routing decisions when the next order is assigned will be different.

Embodiments of a driver selecting engine can thus be used as both an advisement tool or an automation tool. In an automation setting, the driver selecting engine can be triggered either at regular intervals or at set times based on order characteristics. For example, a driver could be selected for an order once the order is received or at later point for a longer same-day order. The driver selection engine can also take these time windows or selection times into account when determining the driver to select, such that when the driver is to be assigned, these times may be taken into account. As an advisement tool, a dispatcher may utilize rankings output by the driver selection engine (e.g., that may include burden and duration of a set of drivers). The advisement mode allows a dispatcher more flexibility in dealing with scenarios or information that may not be explicitly captured by the data utilized by the delivery service system.

Looking now at FIG. 1, a block diagram depicting one embodiment of a routing system for the automated real-time routing or assignment of orders within a fleet of geographically distributed drivers is presented. A delivery service provider may include a fleet of drivers 103 that are deployed within a defined geographic area 110 (also referred to as a market). It will be noted here, that while the term "driver" is utilized herein, these drivers 103 may utilize almost any form of transport (or combination of forms of transport) to make deliveries within the geographic area including, for example, motorized vehicles, bicycle, walking, public transport or some other transport mechanism or combination of transport mechanisms. The geographic area 110 may be, for example, a city, zip code, county, Designated Market Area (DMA), state or some other definition of a geographic area. The routing system 120 is utilized by the delivery service provider to receive orders within the market 110 to assign the orders to drivers 103 in the market 110 for delivery and to route each driver within the market based on the orders assigned to the driver 103.

The routing system 120 may be coupled to computing devices 106 of order initiators and computing devise 104 of drivers 103 over network 190, which may include any of a variety of types of wired or wireless network such as the Internet, a private intranet, a mesh network, a Wide Area Network (WAN), a Local Area Network (LAN), a public switch telephone network (PSTN), a cellular network or any other type of network or combination of networks.

Order initiators may initiate orders through an order interface 126 offered by routing system 120. This order interface 126 may be a web or network based interface accessible through a browser or other application (e.g., an "app") on a computing device 104 (e.g., laptop, desktop, smart phone, tablet, etc.) of the order initiator. Such interfaces may include, for example, a web site, web Application Programming Interfaces (API) such as RESTful or other web services interfaces, or another type of interface accessible over network 190.

FIGS. 4A-4D depict embodiments of order interfaces which may be utilized by routing system 120 to allow an order initiator to initiate and order. These interfaces may be provided by order interface 126 through a browser or application (e.g., an "app"), on a user's device 106. These interfaces may allow an order initiator or dispatcher to provider an origination location and a destination location and other order criteria through the order interface. These other criteria may include, for example, any pick-up time window or delivery time window, the weight of the item to be delivered, any time windows or times associated with the pick-up or delivery of the order, any necessary or desired equipment to be used for the order (for example, access cards, lift gates on a vehicle, etc.), and necessary or desired compliance or training for the driver (e.g., Health Insurance Portability and Accountability Act (HIPAA) compliance or the like), any vehicle size needs (e.g., van or truck), any requirements for completion of any order (e.g., signature at delivery or picture of delivery) and any other remarks which may needed or helpful for completion of the order (for example, gate codes, identification of entrances at the destination location, a phone number to call at delivery, etc.).

Returning to FIG. 1, the order initiator thus submits an order including a request for delivery of an item having an origination location and a destination location and other order criteria through the order interface 126. The other order criteria may include, for example, a corresponding pick-up time window or delivery time window. Alternatively, a dispatcher associated with the routing system 120 may receive an order from an order initiator (e.g., through the order interface 126, through a telephone call, or in another manner) and enter the order to the routing system 120 through the order interface 126. The received orders 182 may be assigned an order identifier, stored in the order storage of the routing system 120 and may include the data associated with the order, including, for example, the origination location and destination location and any order criteria or data such as any pick-up time window or delivery time window, an order status (e.g., new, assigned, picked up or not, in-transit, delivered or completed, etc.), an identifier for any driver assigned to the order, or other information, a distance between the pick-up location and the destination location, including the weight of the item to be delivered, any time windows or times associated with the pick-up or delivery of the order, any necessary or desired equipment to be used for the order (for example, access cards, lift gates on a vehicle, etc.), and necessary or desired compliance or training for the driver (e.g., Health Insurance Portability and Accountability Act (HIPAA) compliance or the like), any vehicle size needs (e.g., van or truck), any requirements for completion of any order (e.g., signature at delivery or picture of delivery) and any other remarks which may needed or helpful for completion of the order (for example, gate codes, identification of entrances at the destination location, a phone number to call at delivery, etc.).

In one embodiment, the order 182 stored in the order storage may be split up into two separate entries in the order storage 180, where a first order entry in the order storage 180 may for the pick-up of the order and the second order entry in the order storage 180 may be for the delivery or destination of the order. Each of the two entries in the order storage for the order 182 may include all of the criteria for the order 182 or may include only the order data associated with the respective entry. For example, the order entry for the order 182 in the storage 180 associated with the order pick-up may include the order identifier and order data associated with the order pick-up (e.g., pick-up location, pick-up time window, equipment, etc.). Similarly, the order entry for the order 182 in the storage 180 associated with the order delivery may include the order identifier and order data associated with the order delivery (e.g., destination location, delivery time window, phone number at destination, gate code, completion requirements, etc.).

Once an order 182 is received, the routing system 120 assigns these orders 182 to drivers 103 associated with the delivery service provider in the geographic area 110 for delivery and determines routes for each driver 103 based on the orders 182 assigned to the driver 103. In one embodiment, an initial set of order screening rules 172 may be applied to a received order to see if that order 182 can be automatically dispatched or assigned to a driver 103. These order screening rules may include rules 172 applicable to the time window of pick-up or delivery associated with the order 182. For example, if the pick-up or delivery of a received order 182 has already passed, the order may not be eligible for automatic assignment and may be flagged for special handling or involvement of a dispatcher. Likewise, order screening rules 172 may screen orders based on the weight of the item to be delivered as specified in the data for the order 182. If the weight of the order 182 exceeds a certain threshold, the order 182 may be flagged for special handling or involvement of a dispatcher. Another order screening rule 172 may be related to the distance between the pick-up and delivery locations for the order. If this distance is greater than some threshold (e.g., 150 miles) the order 182 and may be flagged for special handling or involvement of a dispatcher. Other rules 172 for initial order screening are possible and are fully contemplated herein. Such order rules 172 may, for example, be specific to a market. Order rules 172 may also comprise one or more models that may be applied to perform such initial order screening. If an order 182 has been flagged for special handling or involvement of a dispatcher through the application of the order screening rules 172, it may for example, be presented for handling to a dispatcher through the dispatcher interface 128.

To assign a received order 182 to a driver 103 (e.g., if the order 182 passes the initial order screening rules), routing system 120 may maintain driver data 152 for each driver 103, where the driver data 152 includes data on that drivers schedule or availability, the driver's current location and a list of orders 182 assigned to that driver 182. In one embodiment, the list of orders 182 associated with each driver 103 may represent a current route for the driver 103. Specifically, as discussed above, each order 182 stored in the order storage 180 may be split up into two separate entries in the order storage 180, where a first order entry in the order storage 180 may for the pick-up of the order (the pick-up order entry) and the second order entry in the order storage 180 may be for the delivery or destination of the order 182 (destination order entry). Accordingly, the driver data 152 may include a sorted list of pick-up order entries and destination order entries for the orders 182 assigned to the driver 103. The sort order of the various pick-up order entries and destination order entries for the orders 182 assigned to the driver represents the current route determined by the routing system 120 for the driver 103.

In particular, each driver 103 may have a computing device 104 executing an application 102 such as a browser or other application (e.g., an "app) that may communicate with driver interface 124 of routing system 120. The driver interface 124 may include, for example, a web site, web APIs such as RESTful or other web services interfaces, or another type of interface accessible over network 190. This application 102 may be used by the driver 103 to accept orders such that an order is assigned to the driver 103 and may present a current route for the orders assigned to the driver 103. This application 102 may also be used by the driver 103 to indicate his schedule, whether the driver 103 is currently available to deliver orders, or other status information associated with the driver 103, including status information associated with orders 182 assigned to the driver 103.

According to one embodiment, the computing device 104 of the driver 103 may include a location determining device or functionality. For example, the computing device 104 may include a Global Positioning System (GPS) of other positioning module adapted to acquire, for example, latitude, longitude, altitude, geocode, course, or speed data. In one embodiment, the GPS module of the device 104 acquires data, sometimes known as ephemeris data, by identifying the number of satellites in view and the relative positions of those satellites. The application 102 may utilize the location determining capabilities of the computing device 104 to determine the location of the driver 104 and report the driver's location in the market 110 to the routing system 120 through the driver interface 124 at some interval. The driver location can be stored in the driver data storage 150 in association with driver data 152 for the driver 104. The current location of the driver 103 can be utilized in the determination of whether to assign an order to a driver 103 or a route for a driver 103.

The routing system 120 may thus maintain driver data 152 for each driver 103 where the driver data 152 includes data on that drivers schedule or availability, the driver's current location (e.g., the driver's current latitude and longitude), the last time an update was received from the driver 103 or the driver's application 102, and a list of orders 182 assigned to that driver 182. Other data associated with a driver 103 may also be stored in the driver data 152, including for example, an identifier for a type of transportation used by the driver 103, the year, make or model of a drivers vehicle, the shift or working hours of the driver 103, a desired start or stop location for the driver 103 when beginning or ending a shift, any certifications that the driver has (e.g., HIPAA certification), or other data.

In one embodiment, at some time interval, the routing system 120 may calculate a route for each driver 103 (or each driver 103 that has a currently assigned orders 182) based on that driver's list of assigned orders 182 (e.g., based on the origination location, destination location and any time windows of each order) and the driver's current location at that time. A route may also be calculated for a driver 103 when a new order is assigned (e.g., and accepted) by that driver 103. This determined route may be stored with the driver data 152 associated with the driver 103. Again, this route may be represented as a sorted list of pick-up order entries and destination order entries for the orders 182 assigned to the driver 103, where the sort order of the various pick-up order entries and destination order entries for the orders 182 assigned to the driver represents the current route determined by the routing system 120 for the driver 103. The application 102 may communicate with the driver interface 124 to obtain the route (e.g., as represented by the sorted list of order entries of orders 182 associated with that driver) and present the route (or next location) for the driver 103 to the driver 103 through an interface of the application 102.

The routing system can thus use the driver data 152 and the data associated with a newly received order 182 to assign the order 182 to an available driver 103. An order assigned to a driver 103 may be dispatched to the assigned driver 104 by the routing system 120 through the driver interface 124. The driver interface 124 may communicate with the application 102 on the assigned driver's device 104 (e.g., through a push notification or the like) that the driver 103 has been assigned the order. In one embodiment, the application 102 may present an interface to the driver 103 asking the driver 103 to accept (or decline) the assigned order. If the driver 103 accepts the assigned order, this acceptance may be communicated from the application 102 to the driver interface 124. The driver interface 124 may update both the data 152 associated with the driver 103 assigned the order 182 such that the list of orders associated with that driver 103 reflects that the assigned order has been added to that driver's orders and the order data 182 associated with that order to reflect that the order 182 has been assigned to that driver 103. In some embodiments, when the order is assigned to the driver 103, the list of orders 182 representing the route associated with that driver may be re-sorted to reflect a route determined for the driver 103 based on the new order 182 and the previous orders 182 assigned to the driver 103.

Similarly, when an assigned order is delivered to the destination associated with the order, the application 102 associated with the driver 103 may communicate an indication that delivery of the order to the destination has been completed through the driver interface 124. For example, the driver 103 may utilize an interface of the application 102 to indicate delivery of the order has been completed. Based on this indication, the application 102 associated with the driver 103 may communicate an indication that delivery of the order to the destination has been completed to the routing system 120 through the driver interface 124. The indication that the order has been delivered may also be determined based on other data, such as, for example, the location of the driver 103 as determined by the location determining device or functionality of the computing device 104 of the driver 103 (e.g., the driver's GPS coordinates). In any event, when it is determined that the order has been delivered, the data 152 associated with the driver 103 assigned the order may be updated to remove that order from the list of orders associated with that driver 103 and the order data 182 associated with that order may be updated to reflect that the order 182 has been delivered (and in some embodiments the time that the order 182 was delivered).

To facilitate the real-time automated assignment of received orders 182 to the drivers 103 geographically distributed within the market 110, routing system 120 includes driver selector 130. When an order 182 is received at the routing system 120 (e.g., through order interface 126), the driver selector 130 may be invoked through selector interface 138, including providing an identifier of the received order 182. The driver selector 130 may be invoked automatically by order interface 126 when a new order is received or when order 182 is stored in order storage 180 (e.g., through a callback or the like). In some embodiments, the driver selector 130 may be invoked after an initial set of order screening rules 172 have been applied to the order 182 to determine if the order may be automatically assigned to a driver 103. When automatically invoked through the selector interface 138, the driver selector 130 may return an identifier of a selected driver 103 to assign the identified received order 182 to the driver interface 124, which may dispatch the received order to the selected driver 103 (e.g., for acceptance).

The driver selector 130 may also be invoked by a dispatcher or other user of the routing system 120 through for example dispatcher interface 128, which may be a web based or other type of interface provided by routing system 120. The dispatcher interface 128 may allow a user to provide an identifier for the order 182 and invoke the driver selector 130 through the selector interface 138. A ranking of a set of drivers 103 may be returned to the user through the dispatcher interface 128. The user may then make a selection of a driver 103 to assign to the order based on the presented rankings. An identifier of the selected driver 103 to assign to the identified order 182 may be provided from the dispatcher interface 128 to the driver interface 124, which may dispatch the identified order to the selected driver 104.

In one embodiment, driver selector 130 includes filter engine 134, routing engine 132 and ranking engine 136. The filter engine 134 may determine all available drivers 103 (e.g., for a received order 182) based on the driver data 152. This may include all currently available drivers 103 or drivers 103 who may be available during a time window associated with pick-up or delivery of the received order 182. This determination can be made, for example, by accessing driver data 152 to determine the shift hours of the drivers from the data and comparing the driver's shift hours to any time windows for the pick-up or delivery of the order 182. The filter engine 134 may also determine driver data 152 associated with each of this initial set of drivers 103, including the list of orders 182 currently assigned to the driver 152, the origination location or destination location associated with each of the orders 182, the status of each of those orders (e.g., picked-up, in-transit, late for delivery, etc.), the type of vehicle (e.g., car, bicycle, etc.) being utilized by the driver 103, any time windows associated with the orders 182 of the driver 103, a currently determined route for the driver 103 (e.g., as represented by the sorted list of pick-up order entries and destination order entries for each order 182 associated with the driver 103), or other driver data 152 associated with the driver. Based on the driver data 152 associated with each of the initial set of drivers 103 and the order data 182, the filter engine 134 may generate a reduced set of drivers 103 by removing drivers 103 from the overall initial set of drivers 103 who have a relatively low possibility or probability of being a good or best driver to assign to the received order 182.

In particular, in one embodiment, the filter engine 134 may include a rules engine 148 and a model engine 154. Rules engine 148 may apply a set of stored driver filtering rules 172 that may serve as a first level of filtering to remove drivers 103 from the overall initial set of drivers 103 that meet (or don't meet) a driver filtering rule 172. These driver filtering rules 172 may include a rule 172 that removes a driver 103 from the overall set of drivers 103 if that driver 103 is already running late on one or more orders 182 previously assigned to the driver 103. Other driver filtering rules 172 may include a rule 172 that removes a driver 103 from the overall initial set of drivers if the distance between the driver's current location (as stored in the driver data 152 for the driver 103) and the pick-up location for the received order 182 is over a threshold distance; a rule 172 that removes a driver 103 from the overall set of drivers 103 if the distance between the driver's current location (as stored in the driver data 152 for the driver 103) and the destination location for the received order 182 is over a threshold distance; a rule 172 that removes a driver 103 from the overall set of drivers 103 if the driver 103 is within a threshold time of going off a shift or stopping work; or a rule 172 that removes a driver 103 from the overall set of drivers 103 if the driver 103 has over a threshold number of currently assigned orders 182. Certain rules may include a rule 172 that removes a driver 103 from the overall set of drivers if the order 182 includes a needed compliance (e.g., HIPAA compliance) that the driver 103 does not have, or a rule 172 that removes a driver 103 from the overall set of drivers 103 if a time period since the driver data 152 associated with that driver 103 was updated exceeds a threshold time period. Certain other rules may pertain to the weight of an item associated with an order 182. Other rules 172 may be envisioned and are fully contemplated herein.

The application of these driver filtering rules 172 to the overall initial set of drivers 103 by the rules engine 148 may thus result in an initially filtered set of drivers 103. Model engine 154 may then apply one or more models 162 stored in model storage 160 to this filtered set of drivers 103 to produce a reduced set of drivers for further evaluation by the routing engine 132. In one embodiment, a model 162 may be trained to determine the probability of selecting a driver 103 given limited inputs. Specifically, just having the two or more locations (e.g., latitudes and longitudes) of a driver's orders 182 does not yield great predictions of transit times. However, to directly determine transit times is a costly process, particularly if one wants real-time traffic. By reducing the number of candidate drivers 103, the model reduces the number of drivers 103 for which routes will need to be calculated including reducing the amount of real-time traffic data needed. This reduction, in turn, reduces the number of computing resources needed for driver selection and reduces the amount of time needed for driver selection by speeding the implementation of the driver selection process.

In certain embodiments, a model 162 may be a machine learning model that can be applied in a classification setting to determine if a driver 103 should be removed from the initially filtered set of drivers. These models 162 may be configured to produce a percentage or other quantitative measure of the likelihood of a particular driver being the optimal or best driver to assign to the order 182 based on a metric, such as lowest additional burden, likelihood of delivering the order on time or another metric. These models 162 may include, for example, support vector machines, decision trees, logistic regression, discriminant analysis, Bayes classifiers, and neural networks, including recurrent neural networks. Other types of models 162 may be utilized and are fully contemplated herein. The model 162 to apply may be selected by the model engine 154 based on one or more criteria, including, for example, the size (e.g., geographic size, population size, size of order volume) of the market 110. For some markets, a recurrent neural network model 162 may be selected. In other embodiments, for relatively bigger markets, a support vector model 162 may be selected while a logistic regression model 162 may be selected for relatively smaller markets.

These models 162 may be trained by model trainer 156 using driver data 152 or order data 182 associated with previously completed orders 182. For example, the model trainer 156 may utilize a historical snapshot of data from previously completed orders 182, including driver data 152 associated with the drivers considered or assigned to the order 182 to optimize or otherwise train a model 162 for a desired metric, such as least additional burden or the like. The model trainer 156 may operate asynchronously or otherwise independently to train, optimize or update these models 162 such that they can be iteratively improved or refined.

In particular instances, classification training by model trainer 156 may entail training the model 162 to select whether a driver 103 is the optimal driver 103 or one of a set of optimal drivers 103 to assign to the order or not. This type of model 162 may result in an unbalanced binary scenario, which may lead to issues of false positives in practical machine learning. It is desired that a filtering function be performed by models 162 where more leniency can be afforded with respect to false positives (e.g., drivers that should be removed from the set of drivers being considered but that are not removed through use of the model 162) but more strictness is desired with respect to false negatives (e.g., drivers that should not be removed from the set of drivers being considered but that are removed through use of the model 162). Therefore, training models 162 may require modification of classic optimization of accuracy to look at containment (optimal driver included in filtered list) and power (size of reduces set of driver list relative to original set of drivers). Therefore, a model 162 may be configured to produce probability estimates or rankings when applied to and driver to allow for strict cutoffs or quantitative cutoffs.

In one embodiment, a model 162 may be trained to determine the probability of selecting a driver 103 given a limited number of specific inputs. Specifically, in one embodiment, a model 162 may be trained by model trainer 154 using one or more snapshots of historical data 158. These historical snapshots 158 may include the operational data of the routing system 120 at one or more points of time in the past when a new order was received, when that new order was being delivered or when that new order was completed (e.g., delivered). Thus, a historical snapshot 158 may include the driver data 152 from those points in time, the order data 182 from those points in time and other data from those points in time. The model 162 may be trained using a set of these historical snapshots 158 of data occurring at a point when a new order 182 was received by the routing system 120 or at other historical time points corresponding to a received order 182.

The model 162 may therefore be trained using these historical snapshots 158 of data to take into account spatial information such as, all locations in drivers' current or combined set of orders when an order was received (e.g., the latitude and longitude of these locations), the pick-up or destination locations associated with a newly received order at the historical point in time, a driver's current location as stored in the driver data associated with the driver at the historical point in time; any temporal information such as the pick-up or delivery time windows associated with each pick-up location or destination location for each order at the time of the historical snapshot 158, the order status for each order associated with a driver at the time of the historical snapshot 158, temporal information (for example, any time windows associated with each location for each order that was assigned to the driver or the time at which the order was received) at the historical point in time, an order status (e.g., picked-up, delivered, etc.) associated with the orders assigned to a driver at the time of the historical snapshot 158, and any links between any pick-up locations and destination locations for each order (in cases, for example, where a destination location is associated with a pick-up location) at the time of the historical snapshot 158.

A model 162 may be a modified nearest neighbor algorithm where drivers are weighted based on their locations' closeness to the pick-up or delivery location of the new order. Closeness may not be based on driving time but straight-line distances utilizing the latitude and longitude of the locations. Closeness to the new order's pick-up location can be weighted higher than closeness to the delivery location; this may be a configuration according to the market 110 for which the model 162 is trained to take into physical aspects of the market 110, as different markets 110 may have different geographic or other considerations entailing the use of different weights. While providing the advantage of simplicity in training and implementation, these types of models 162 have also proven to have decent performance with inclusion rates (e.g., the percentage of times the optimal driver as determined from a historical snapshot 158 from when the order was delivered is included in the final candidate list) of around 80%.

Accordingly, after a model 162 is selected, the model engine 154 may perform any required data transformation on the driver data 152 or order data 182 for application of a selected model 162 to the data associated with the drivers 103 of the initially filtered set of drivers 103. The results of the application of the model 162 to each of the drivers 103 of the initially filtered set of drivers 103 may be used to determine a list of drivers 103 with a high probability that one of them will be the best choice for the new order. The selection of the list of drivers 103 with a high probability may be parameter controlled and configurable in model engine 154. For example, the selection of the number of drivers 103 in the list may be based on a percentage cutoff (e.g., any drivers which the selected model 162 determines have over a certain percentage likelihood may be selected) or ranking values (e.g., the top 5 highest ranked drivers as ranked by the application of the model 162) may be selected. The selection parameters may be tuned based on characteristics of the market 110 and may be flexible enough to allow a strict cutoff, (e.g., no more than 4), or quantitative cutoff such as probabilities higher than 75%. When strict cutoffs are employed, drivers 103 may ranked based on either probabilities (e.g., for a classification model) or quantitative values (e.g., for a regression model).

This reduced set of drivers or list of drivers (e.g., the drivers determined by the application of model 162 by the model engine 154) may be provided from the filtering engine 134 to the routing engine 132. The routing engine 132 may determine the burden of adding the newly received order 182 to the remaining drivers (e.g., the reduced set of drivers 103 determined by the application of the model 162 by the model engine 154) and account for real-time conditions (such as traffic) and other order specifics (e.g., time windows, any time required at the pick-up location or destination location to pick-up or set-up an order, etc.) when making this determination. To this end, to facilitate the determination of which driver 103 of the reduced list of drivers 103 to assign the order 182 to, the routing engine 132 may build or evaluate two optimized or pseudo-optimal routes for each driver 103. One route for the driver 103 with the current set of orders assigned to the driver 103 and one route for the combined set of orders (the current set of orders 182 assigned to the driver 103 plus the new order 182). The use of optimized or pseudo-optimized routing to build a route for the current set of orders or combined set of orders for a driver 103 may be determined based on the number of locations (e.g., the number of locations associated with each of the orders) assigned to the driver 103.

For each of the reduced set of drivers 103, then, the routing engine 132 may determine a total duration to complete the driver's current set of orders 182, a total duration to complete the set of orders assigned to the driver 103 if the newly received order 182 was added to the current orders of the driver (referred to as the combined set of orders) and a corresponding burden (which may be the difference between the two determined total durations for that driver 103). To make such determinations, the routing engine 132 may first build a route for the current set of orders for the driver 103 and a route for the combined set of orders for the driver 103. These routes may set out both an order of travel between the locations associated with each order of the set of orders (e.g., the pick-up location and the delivery location associated with each order 182) and the routes to take between the locations. The building of each of these routes may utilize optimal routing engine 142 or non-optimal routing engine 144 to build an optimal or pseudo-optimal route. It will be noted here that a route for the current order list of a driver may have previously been built and stored for the driver (e.g., the stored sorted list of pick-up entries and destination entries for all the orders 182 currently assigned to the driver 103). In certain embodiments, then, this previously built route may be utilized and there may be no need to create a route for the current order list of the driver 103 when determining the total duration for a driver's current order list.

In instances when many locations are present, pseudo-optimized routes may be built. Thus, the determination as to whether to utilize optimal routing engine 142 or non-optimal routing engine 144 to build the route may be based on the number of locations in the set of orders for which the route is being determined (e.g., the current set of orders for the driver or the combined set of orders for the driver). In one embodiment, if the number of locations in the set of orders is 9 or below, the optimal routing engine 142 may be utilized to determine the route, while if the number of locations in the set of orders is above 9, the non-optimal routing engine 144 may be utilized. This determination is based on the scaling problem of practical vehicle routing. Literature research indicates that only small problems can be optimized in a practical time frame and heuristics & meta-heuristics are used to find routes that are close to optimal.

The routing engine 132 may allow for almost any type of route builder desired. In one embodiment, the optimal routing engine 132 or non-optimal routing engine 144 may be based on the number of locations associated with the list of orders. From lowest to highest number of locations, a routing engine 132 may use brute-force search optimization, integer programming, meta-heuristic search, heuristic route builders or other route builders. Brute-force optimization goes through every possible route and may only be practical in very small problems (around 5 locations). Integer programming reformulates the problem to allow for a smarter search using mathematical inequality properties. This solution may scale better than brute-force search but may still become impractical at modest problem sizes (close to double digit locations). Meta-heuristics, such as genetic algorithms and particle swam optimization use search algorithms with a finite terminal criterion. These algorithms may scale better, but it can be difficult to know how close to optimal they are. Heuristic solutions construct routes rather than search routes. While they are usually quickest to execute, like meta-heuristics, it may be difficult to know how close to optimal the solution is. The former two method classes result in optimized solutions while the latter two result in pseudo-optimized solutions. These optimal or pseudo-optimal routes may be built using, for example, commercial generic optimizers (e.g., Gurobi, CPLEX); open-source generic optimizers (e.g., GLPK (GNU Project), COIN-OR/SYMPHONY), optimization tools (e.g., Google Optimization Tools, OptaPlanner) or other routing tools (e.g., Google Maps Directions, Grasshopper, OptiMap, Routist, Open Door Logistics). Other types of algorithms and rules that may be employed by optimal routing engine 142 or non-optimal routing engine 144 will be understood by those of ordinary skill and are contemplated herein without limitation.

Once the routes for each set of orders (e.g., the current set of orders for the driver and the combined set of orders for the driver) are built for a driver 103, routing engine 132 may determine a total duration associated with each route. Each route may include an ordered set of destinations, where each destination is associated with a pick-up or destination location of an order. To determine the total duration for a route the routing engine 132 may determine current travel times for each "hop" or "leg" (pair of locations) of the route. In one embodiment, to determine such travel times routing engine 132 may utilize map interface 122 to query an interface of a third party provider of such travel times such as a Google Maps API or the like. The provided travel times may account for current real-time traffic or other road conditions and may be based on the vehicle being utilized by the driver (e.g., motorized vehicle, bicycle, etc.). The current travel times for each hop of the determined route may thus be returned to the routing engine 132 through the maps interface 122 and used to determine the total duration for the route such that the determined total duration for the route may account for real-time traffic or other road conditions.

Additionally, in some embodiments, any additional time (e.g., non-transit time) required at each destination of the leg (or between each of the locations) may be added to the current travel times (also referred to as the transit time) for each leg to determine either total duration for a leg or the total duration of the route. For example, buffer time for loading or unloading of orders may be added to the total duration determined for a route. This component may accounts for, but is not limited to, parking and loading time (which may be associated with the pick-up entry or destination entry of the order 182). Buffer time may also include a wait time. For example, a wait time may be added if a predicted arrival at a pick-up or destination location for an order is before the associated time window for pick-up or delivery for that order. In this case, the time difference between the predicted arrival and the time window may be added to the total duration. As another example, if a current time is before driver's shift, the time until the driver's shift may be added to the total duration. As but one more example, if there is a service time associated with an pick-up entry or destination entry for an order 182 (e.g., non-transit time after arrival at a location to account for activities after delivery, such as helping set up food) this service time may be added to the total duration. In one embodiment, buffer time and service time may be distinct segments utilized in determining total duration of a leg or route to take into account activity done before and after arrival times, respectively. Service time segments may be utilized to account for time after a time window for delivery without an order being considered late. Other non-transit times that may be utilized in the determination of the total duration of a leg or a total duration of a route are fully contemplated herein.

Based on the total duration for the route determined for the driver's current set of orders, and the total duration for the route determined for the combined set of orders for the driver (e.g., the driver's current orders plus the received order), a burden may be determined for the driver 103 by determining the differences between the total durations for the routes. This burden reflects that additional amount of time that it would take for that driver 103 to complete his set of orders if the received order was assigned to him. Once the routes (e.g., routes for the current set of orders and the combined set of orders), the total duration for both routes, and the burden are determined for each driver of the reduced set of drivers by the routing engine 132, this information may be provided to ranking engine 136.

The ranking engine 136 may rank the reduced set of drivers 103 based on the burden or total durations determined for each of those drivers by the routing engine 132. The weight given to the burden or total durations for the routes may be based on ranking configuration 146 which may be configurable by a user of the routing system 120 or which may itself employ a machine learning model. This flexibility may be useful as each market 110 may have different spatiotemporal characteristics with respect to clientele and demand. In addition, specific time windows can vary by industry or specific brands. The ranking configuration 136 can be tuned to meet these needs. For example, the ranking engine 136 may rank the drivers based solely on the burden associated with each driver, a weighted sum of burden and duration, or a two-layer decision tree of burden then duration. In one embodiment, once the drivers are ranked, the ranking engine 132 may apply one or more of rules 172 to the ranked drivers to ensure that no rules 172 are violated and remove any drivers from the ranked list if any rules 172 are violated.

Driver selector 130 can utilize the ranking of the drivers 103 determined by the ranking engine 136 to automatically select the highest ranking driver 103 and assign the order to this highest ranking driver 103. The driver selector 130 may then return an identifier of the selected driver 103 to assign to the received order 182 to the driver interface 124, which may dispatch the received order to the selected driver 104.

Alternatively, the rankings of the drivers 103 may be returned to the dispatcher interface 128 and presented through the interface 128 (along with possibly other information such as the total duration(s) or burden) such that a user may utilize the ranking or other data presented in the interface 128 to select a driver based on the presented data and assign the order to the selected driver.

In one embodiment, the ranking engine 136 may utilize the optimized or pseudo-optimize route information determined for a driver's each set of orders (e.g., the current set of orders for the driver and the combined set of orders for the driver) to augment the baseline metric of burden for to rank and select a driver. For example, the ranking engine may utilize the following data for a driver: the total duration to complete all assigned order for the current set of orders for a driver or the combined set of orders for a driver, any waiting times associated with any of the orders for the driver in either the current set of orders or the combined set of orders for the driver, the time until the newly received order is due, how many locations or orders are currently assigned to the driver (including if no orders are currently assigned to a driver), when the driver ends his shift, how close the driver is to the end of his shift, or any desired end location for a driver (e.g., as specified in the driver data 152).

The selection of the driver may then be based on the best augmented metric. Additionally, the ranking engine 136 can decide not to assign even after all calculations are done. If for example, the best candidate's metric is not below a certain threshold, the ranking engine 136 may not select a driver 103 and may instead provide an alert to a dispatcher through the dispatcher interface 128 such that a dispatcher may handle the newly received order. This threshold may be another parameter that is adjustable based on different markets. As but a simple example, in one embodiment, an augmented metric for driver ranking and selection may be 0.5*burden+0.5*total duration. This augmentation gives more preference to drivers with shorter routes. As another example, an augmented metric for an empty driver (a driver with no orders currently assigned) may be 0.25*burden to ensure more even distribution of workload. As one example where the ranking engine 136 may not select a driver, a scenario may occur where the highest ranking driver has a determined burden of one hour but this metric is below a burden threshold of 45 minutes. In this case, the ranking engine 136 may raise an alert through dispatcher interface 128 to have the newly received order evaluated or assigned by a dispatcher.

Once the order is assigned to a selected driver, the assigned driver may be notified and presented with a chance to accept the order through the driver's application 102. The presentation and acceptance (or decline) of the order may be accomplished, for example, through driver interface 124 to present the assigned order through application 102 on the driver's computing device 104. It can then be determined if the driver's acceptance of the order was received. In one embodiment, if the assigned driver accepts the order, the driver's order list (and, in some embodiments, route) may be updated in the driver's data 152 and the data associated with the order 182 may also be updated. Specifically, in one embodiment, the list of orders associated with the driver may be updated by inserting a pick-up order entry and a destination order entry for the accepted order into the list of order entries of orders 182 assigned to the driver and re-sorting the list according to the route determined for the combined order list for that driver. In this manner, the driver data 152 for that driver may now include a sorted list of pick-up order entries and destination order entries for the orders assigned to the driver that includes the newly accepted order, where the sort order of the various pick-up order entries and destination order entries for the orders assigned to the driver represents the current route for the driver.

In one embodiment, to facilitate the re-sorting of a driver's list of orders, when the routes for the combined order list for each driver are determined, the determined routes may be stored in a memory such that it can be later used to re-sort a driver's order list when a driver accepts the order. If non-optimal routing was utilized to determine a route for a combined order list for a driver, it may be desired to apply optimal routing 142 at the point a driver 103 accepts an order 182. Thus, in one embodiment, if non-optimal routing 144 was applied to determine the route for a combined order list for a driver 103 that accepted the order 182, at the point the order 182 is accepted by the driver 182, an optimal route may be determined for the driver 103 by optimal routing 142 based on the combined list of orders 182 for the driver. This optimal route can then be used to re-sort the driver's order list such that driver data 152 for that driver may include a sorted list of pick-up order entries and destination order entries for the orders assigned to the driver that includes the newly accepted order, where the sort order of the various pick-up order entries and destination order entries for the orders assigned to the driver represents the current route for the driver.

FIGS. 5A-5D depict embodiments of interfaces which may be utilized by an application 102 at the driver's device 104 where the interfaces may be presented, populated or otherwise configured, by the routing system 120 through the driver interface 124. These interfaces may, for example, present a driver 103 with a list of orders 182 currently assigned to the driver along with associated times or time windows, a current status of orders assigned to the driver 103, the ability to check-in or provide status information to the routing system 120 or route information.

Figure 2B:
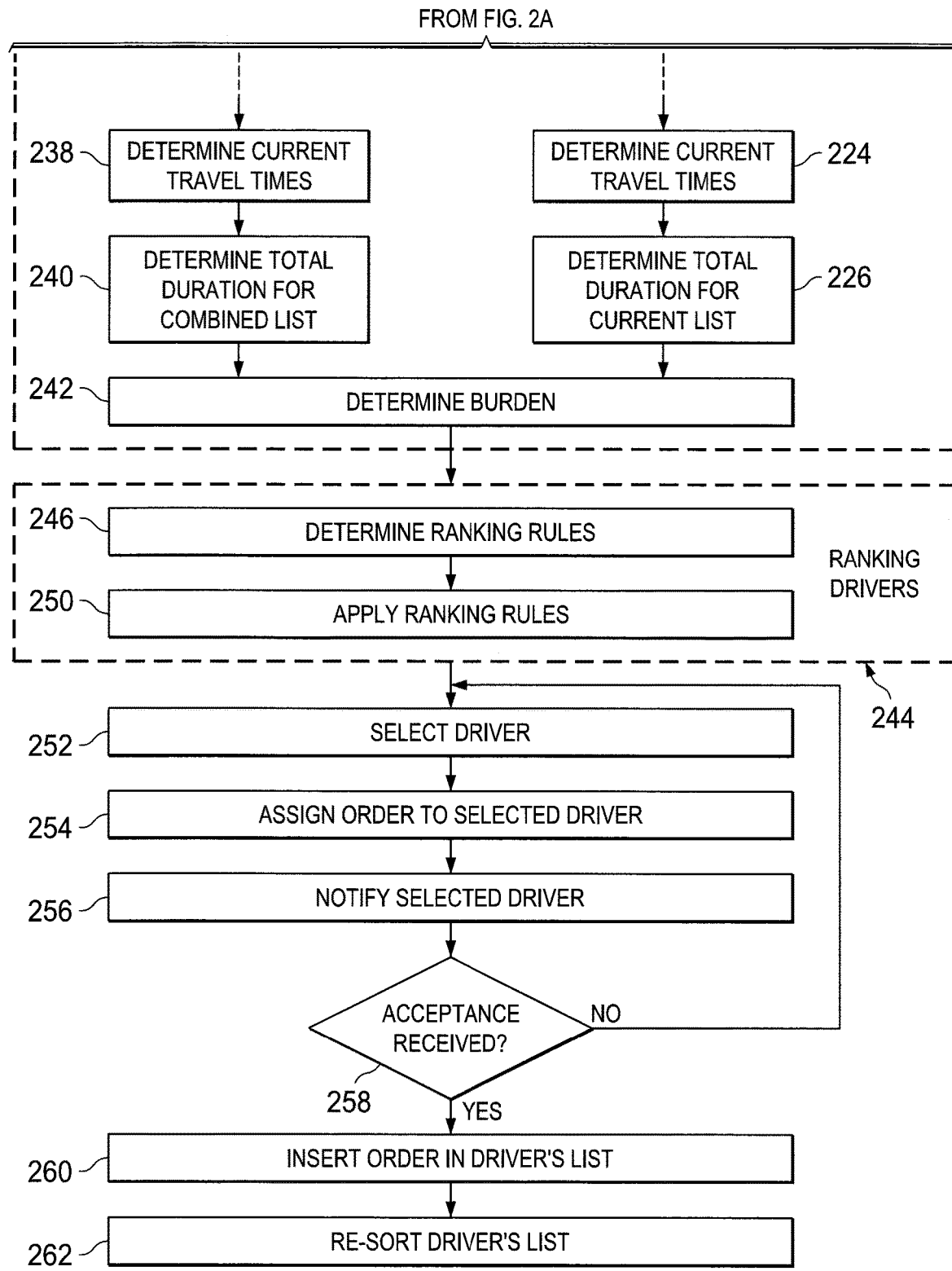

Referring now to FIGS. 2A and 2B, embodiments of a method that may be utilized by embodiments of a routing system to select a driver for an order are depicted. Initially, an order may be received (STEP 200). An initial set of order screening rules may be applied to determine if to see if that order can be automatically dispatched or assigned to a driver (STEP 202). These order screening rules may include rules applicable to the time window of pick-up or delivery associated with the order, the weight of the item to be delivered, the distance between the pick-up and delivery locations for the order, or other criteria. At this point, if an order has been flagged for special handling, or involvement of a dispatcher, through the application of the order screening rules, it may for example, be presented for handling to a dispatcher.

Otherwise, an initial set of drivers to evaluate may be determined for the received order (STEP 204). This determination may be made based on the driver data associated with drivers of the delivery service provider. This initial set of drivers may include all currently available drivers, or drivers who may be available during a time window associated with pick-up or delivery of the received order or based on some other criteria. In association with the determination of the initial set of drivers, driver data associated with each of the initial set of drivers may also be determined. This driver data may include, for example, a list of orders currently assigned to the driver, the pick-up location or destination location associated with each of the orders associated with the driver, the status of each of those orders (e.g., picked-up, in-transit, late for delivery, etc.), the type of vehicle (e.g., car, bicycle, etc.) being utilized by the driver, any time windows associated with those orders, a currently determined route for the driver (e.g., which may be a sorted list of the pick-up entries and destination entries for orders currently assigned to the driver indicating a currently determined route for the driver) or other driver data associated with the driver.

This overall initial set of drivers may then be filtered to generate a reduced set of drivers (STEP 206). This generation may remove drivers from the overall initial set of drivers who have a relatively low possibility or probability of being a good or best driver to assign to the order based on the driver data associated with each of the overall initial set of drivers and the order data of the received order. In particular, in one embodiment, a set of stored rules may be applied (STEP 208) to serve as a first level of filtering to remove drivers from the overall set of drivers that meet (or do not meet) a rule. These rules may include, for example, a rule that removes a driver from the overall set of drivers if the distance between the driver's current location and the pick-up location for the order is over a threshold distance or a rule that removes a driver from the overall set of drivers if the distance between the driver's current location and the destination location for the order is over a threshold distance. Other rules may be envisioned and are fully contemplated herein. The application of the rules to the overall initial set of drivers may thus result in an initially filtered set of drivers.

One or more models may be applied to the drivers of this initially filtered set of drivers to produce a reduced set of drivers (STEP 210). In certain embodiments, a model may be a machine learning model that can be applied in a classification setting to determine if a driver should be removed from the initially filtered set of drivers. These models may be configured to produce a percentage or other quantitative measure of the likelihood of a particular driver being the optimal or best driver to assign to the order. These models may be configured to produce a percentage or other quantitative measure of the likelihood of a particular driver being the optimal or best driver to assign to the order based on a metric, such as lowest additional burden, likelihood of delivering the order on time or another metric. These models may include, for example, support vector machines, decision trees, logistic regression, discriminant analysis, Bayes classifiers, and neural networks, including recurrent neural networks. Other types of models may be utilized and are fully contemplated herein. The model to apply may be selected based on one or more criteria, including, for example, the size (e.g., geographic size, population size, size of order volume) of the market. For some markets, a recurrent neural network model may be selected. In other embodiments, for relatively bigger markets, a support vector model may be selected while a logistic regression model may be selected for relatively smaller markets.

The results of the application of the model to each of the drivers of the initially filtered set of drivers may be used to determine a list of drivers with a high probability that one of them will be the best choice for the new order. The selection of the list of drivers with a high probability may be parameter controlled and configurable. For example, the selection may be based on a percentage cutoff (e.g., any drivers which the model determines have over a certain percentage likelihood may be selected) or ranking values (e.g., the top 4 highest ranked drivers as ranked by the application of the model) may be selected.

Routing may then be determined for each of the reduced set of drivers (e.g., the drivers determined at STEP 210) (STEP 212). The goal of the routing determination may be to determine the burden of adding the new order to the remaining drivers and account for real-time conditions (such as traffic) when making this determination. To this end, for each driver in the reduced set of drivers, two optimized or pseudo-optimal routes may be built or evaluated: one route with the current set of orders for a driver and one route with the new order added to the current set of orders. These routes may set out both an order of travel between the (e.g., the pick-up and destination) locations associated with each order of the set of orders and the routes to take between the locations. The use of optimized or pseudo-optimized routing may be determined based on the number of locations of the orders (e.g., each order may have two or more locations, the pick-up locations and destination location) assigned to the driver. In particular, for each of the reduced set of drivers, a total duration may be determined for completion of the driver's current set of orders; a total duration may be determined for completion of the set of orders assigned to the driver if the received order was added to the current orders of the driver (referred to as the combined set of orders); and a corresponding burden may be determined for the driver (which may be the difference between the two determined total durations for the current set of orders and combined set of orders that driver).

Accordingly, for each driver, the driver and order data may be determined (STEP 214), including for example, the driver's current order list (e.g., a sorted list of pick-up entries and destination entries for all the orders currently assigned to the driver) and associated order data for orders in the current order list such as the pick-up and destination locations and time windows, any associated time windows, set-up times, or other order data. To determine a total duration for the current order list, the number of locations (or orders) in the current order list of the driver may be determined (STEP 222). The number of locations, may for example, correspond to the number of entries in the driver's current order list comprising the sorted list of pick-up entries and destination entries for all the orders currently assigned to the driver.

The building of routes may utilize an optimal routing engine or a non-optimal routing engine to build an optimal or pseudo-optimal route. Thus, it can be determined if the number of locations in the current order list is greater than a threshold number of locations (STEP 216). In one embodiment, if the number of locations (or orders) is at or below the threshold (e.g., 9 locations) the optimal routing engine may be utilized to determine the route (STEP 218), while if the number of locations in the set of orders is above the threshold (e.g., 9) the non-optimal routing engine may be utilized (STEP 220). It will be noted here, that a route for the current order list of a driver may have previously been built and stored for the driver (e.g., a stored sorted list of pick-up entries and destination entries for all the orders currently assigned to the driver). In certain embodiments, then, this previously built route may be utilized, and there may be no need to create a route for the current order list of the driver when determining the total duration for a driver's current order list.

Once the route for the current set of orders is built (or obtained) for the driver, a total duration associated with that route may be determined (STEP 226). To determine the total duration for a route, the current travel times for each "hop" or "leg" (pair of locations) of the route may first be determined (STEP 224). Specifically, the route for the current set of orders may include an ordered set of destinations, where each destination is associated with a pick-up or destination location of an order. To determine the total duration, current travel times for each "hop" or "leg" (pair of locations) of the route may be determined.

In one embodiment, to determine such travel times an interface of a third party provider of such travel times such as a Google Maps API or the like may be queried based on each pair of locations of a hop to determine the travel time associated with that hop. The provided travel times may account for current real-time traffic or other road conditions and may be based on the vehicle being utilized by the driver (e.g., motorized vehicle, bicycle, etc.). The current travel times for each hop of the determined route may thus be returned through the maps interface and used to determine the total duration for the route such that the determined total duration for the route may account for real-time traffic or other road conditions. Additionally, in some embodiments, any additional time (e.g., non-transit time) required at each destination of the leg (or between each of the locations) may be added to the current travel times (also referred to as the transit time) for each leg to determine either total duration for a leg or the total duration of the route.

To determine a total duration for the combined order list, the received order may be added to the current order list of the driver (STEP 228) and the number of locations (or orders) in the combined order list determined (STEP 230). It can be determined if the number of locations in the combined order list is greater than a threshold number of orders (STEP 232). In one embodiment, if the number of locations (or orders) is at or below a threshold (e.g., 9 locations) the optimal routing engine may be utilized to determine the route (STEP 234), while if the number of locations (or orders) in the combined set of orders is above the threshold the non-optimal routing engine may be utilized (STEP 236). It should be noted here that the threshold utilized for the number of locations in the combined set of orders may be the same as, or different than the threshold utilized for determining the type of route determination to employ for the current set of orders.

Once the route for the combined set of orders is built, a total duration associated with that route may be determined (STEP 240). To determine the total duration for the route the current travel times for each "hop" or "leg" of the route may first be determined (STEP 238). The determined total duration for the route for the combined order list may thus account for real-time traffic or other road conditions. Additionally, in some embodiments, any additional time (e.g., non-transit time) required at each destination of the leg (or between each of the locations) may be added to the current travel times (also referred to as the transit time) for each leg to determine either total duration for a leg or the total duration of the route.

Based on the total duration for the route determined for the driver's current set of orders and the total duration for the route determined for the combined set of orders for the driver, a burden may be determined for the driver by determining the differences between the total durations (STEP 242) for each set of orders (e.g., the current set of orders and the combined set of orders). This burden reflects that additional amount of time that it would take for that driver to complete his set of orders if the received order was assigned to him. Once the routes (e.g., routes for the current set of orders and the combined set of orders), total duration for both routes and the burden are determined for each driver of the reduced set of drivers, the reduced set of drivers may be ranked (STEP 244). The ranking may be based on the total durations or burden associated with each of the reduced set of drivers.

Initially, a ranking configuration including a set of ranking rules may be determined (STEP 246). The ranking configuration can then be applied to rank the drivers (STEP 250). The weight given to the burden or total durations for the routes may be based on the ranking configuration which may be configurable by a user of the routing system or which may itself employ a machine learning model. For example, the ranking engine may rank the drivers based solely on the burden associated with each driver, a weighted sum of burden and duration, or a two-layer decision tree of burden then duration.

The ranking of the drivers may be used to select a driver (STEP 252) to assign to the received order (STEP 254). In one embodiment, the highest ranking driver may be automatically selected and assigned to the order. Alternatively, the rankings of the drivers may be returned and presented through an interface such that a user may utilize the ranking or other data presented in the interface select a driver based on the presented data and assign the order to the selected driver. In one embodiment, the ranking and selection of a driver may utilize the optimized or pseudo-optimize route information determined for each driver's set of orders (e.g., the current set of orders for the driver or the combined set of orders for the driver) to augment the baseline metric of burden for to rank and select a driver. For example, the following data to rank and select a driver: the total duration to complete all assigned order for the current set of orders for a driver or the combined set of orders for a driver, any waiting times associated with any of the orders for the driver in either the current set of orders or the combined set of orders for the driver, the time until the newly received order is due, how many locations or orders are currently assigned to the driver (including if no orders are currently assigned to a driver), when the driver ends his shift, how close the driver is to the end of his shift, or any desired end location for a driver. The selection of the driver may then be based on the best augmented metric.

Once the order is assigned to the selected driver (STEP 254), the assigned driver may be notified and presented with a chance to accept the order (STEP 256). The presentation and acceptance (or decline) of the order may be accomplished, for example, through a driver interface that presents the assigned order through an application on the driver's computing device. It can then be determined if the driver's acceptance of the order was received (STEP 258). In one embodiment, if the assigned driver accepts the order (Y branch of STEP 258) the driver's order list (and, in some embodiments, route) may be updated in the driver's data and the data associated with the order may also be updated. Specifically, in one embodiment, the list of orders associated with each driver may be updated by inserting a pick-up order entry and a destination order entry for the accepted order into the list of order entries of orders assigned to the driver (STEP 260) and re-sorting the list (if needed) according to the route determined for the combined order list for that driver (STEP 262). In this manner, the driver data for that driver may include a sorted list of pick-up order entries and destination order entries for the orders assigned to the driver (including the newly accepted order), where the sort order of the various pick-up order entries and destination order entries for the orders assigned to the driver represents the current route for the driver.

In one embodiment, to facilitate the re-sorting of a driver's list of orders, when the routes for the combined order list for each driver are determined (STEP 218 or STEP 220) the determined routes may be stored in a memory such that it can be later used to re-sort a driver's order list when a driver accepts the order. If non-optimal routing was utilized to determine a route for a combined order list for a driver (STEP 220), it may be desired to apply an actual optimal routing algorithm at the point a driver accepts an order. Thus, in one embodiment, if non-optimal routing was applied to determine the route for a combined order list for a driver that accepted the order, at the point the order is accepted an optimal route may be determined for the driver based on the combined list of orders for the driver. This optimal route can then be used to re-sort the driver's order list such that driver data for that driver may include a sorted list of pick-up order entries and destination order entries for the orders assigned to the driver (including the newly accepted order), where the sort order of the various pick-up order entries and destination order entries for the orders assigned to the driver represents the current route for the driver.

If however, the user declines the order (or a certain amount of time elapses after the user is presented with the order) (N branch of STEP 258), another driver may be selected and assigned (STEP 252). The selection of another driver may entail the selection of another driver based on the rankings (e.g., the second highest ranked driver) or another set of drivers (e.g., not including the declining driver) may be re-ranked and the highest ranking driver selected. Other methods for selecting another driver may be envisioned and are fully contemplated herein.

It may be useful here to briefly describe an example deployment of an embodiment of the routing systems and methods as discussed herein in the context of an overall system for operating a delivery or routing organization. As may be imagined, in the context of such organizations, these overall systems may be accessed by a large number of distributed dispatchers and drivers, users, clients, third parties, employees, etc. substantially simultaneously. To facilitate these accesses and provide high availability and fault tolerance for such systems, among other advantages, these overall systems may be deployed in a cloud based computing architecture such as Amazon Web Services (e.g., Elastic Compute Cloud or EC2), the Google Cloud Platform, Microsoft Azure or another cloud based computing platform.

Figure 3:
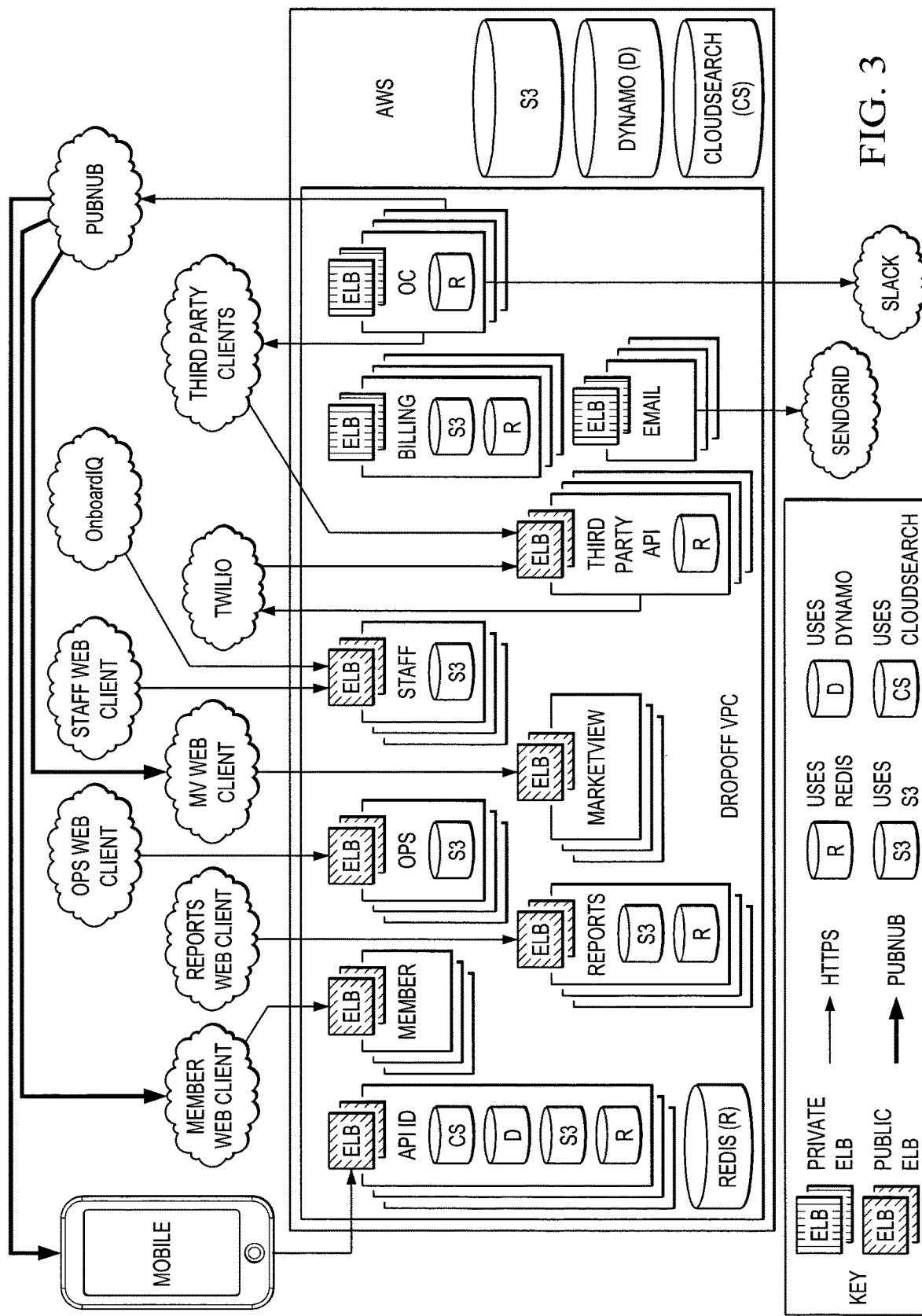
FIG. 3 is a block diagram of an embodiment of architecture for a system including an embodiment of a routing system for the automated real-time routing or assignment of orders within a fleet of geographically distributed drivers.
Figure 5A:
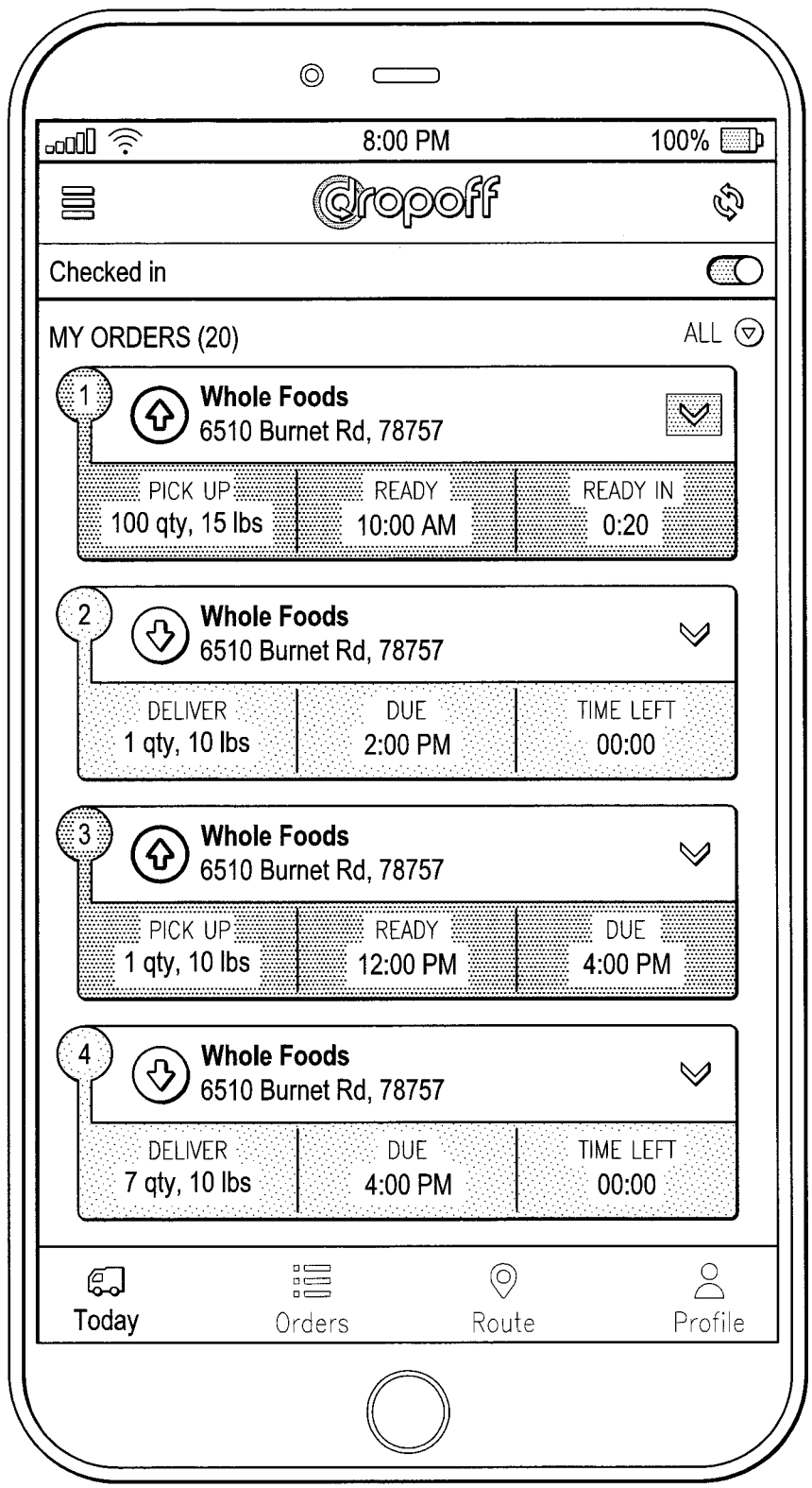
FIGS. 5A-5D depict embodiments of interfaces of a driver application.
Figure 5B:
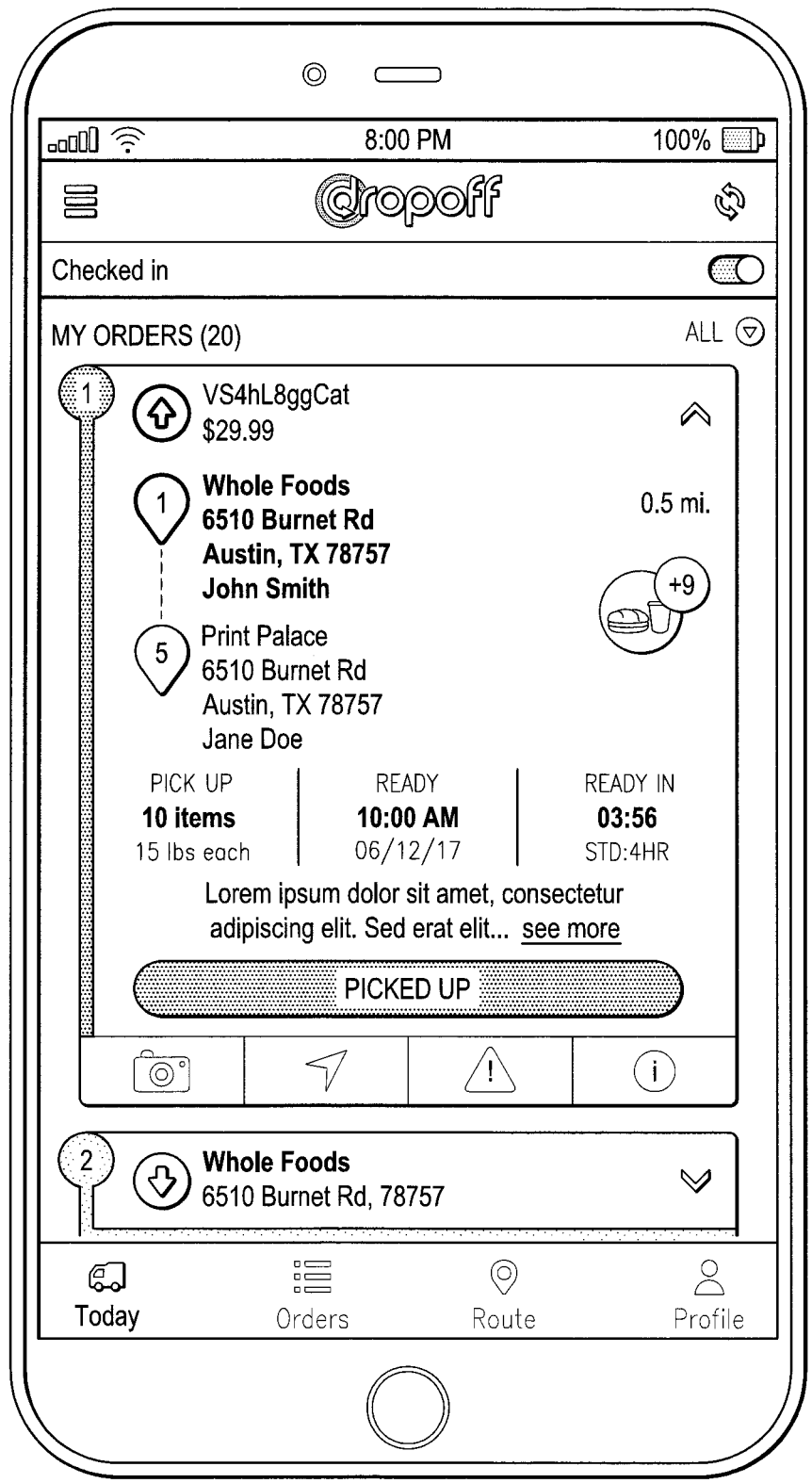
Figure 5C:
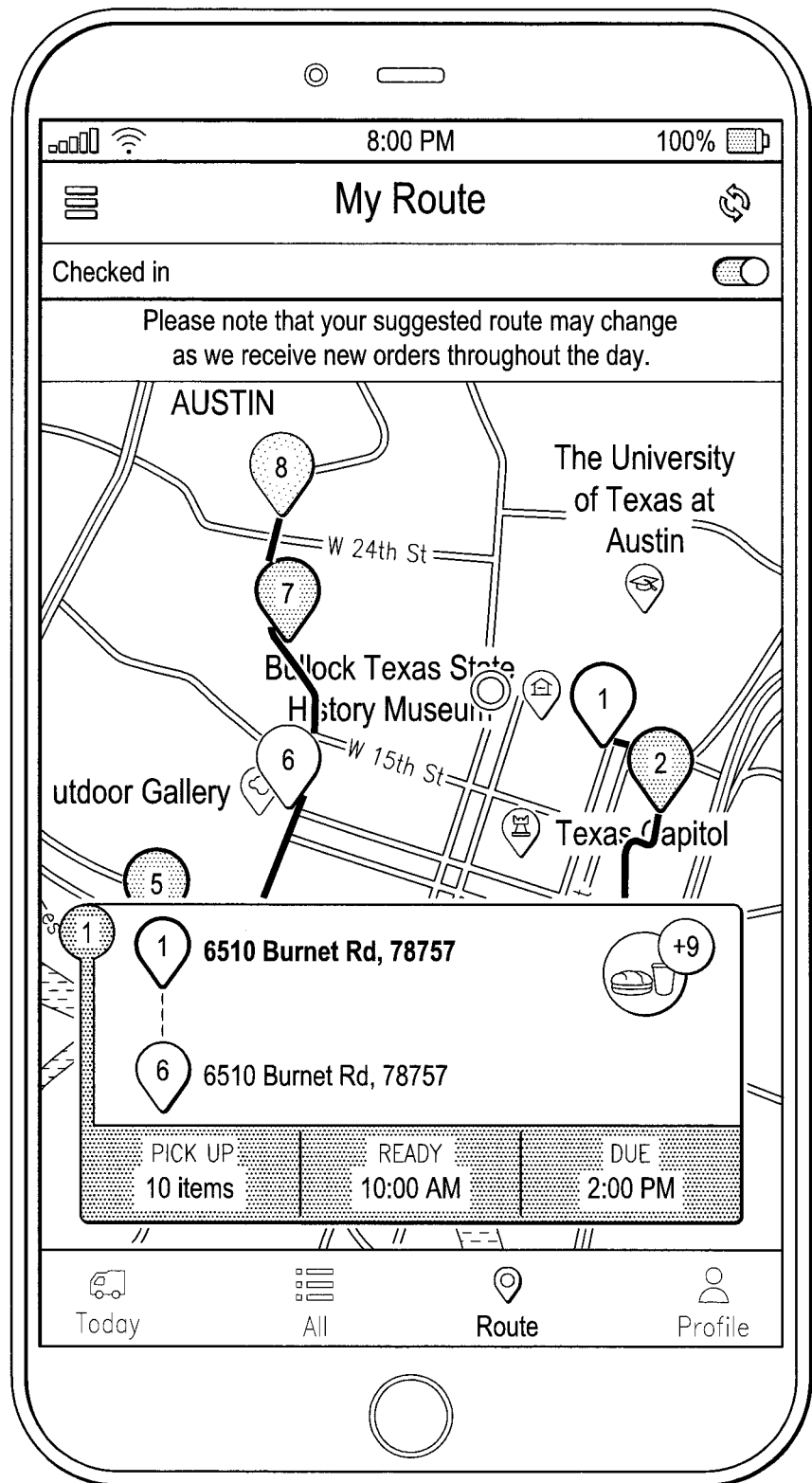
Figure 5D:
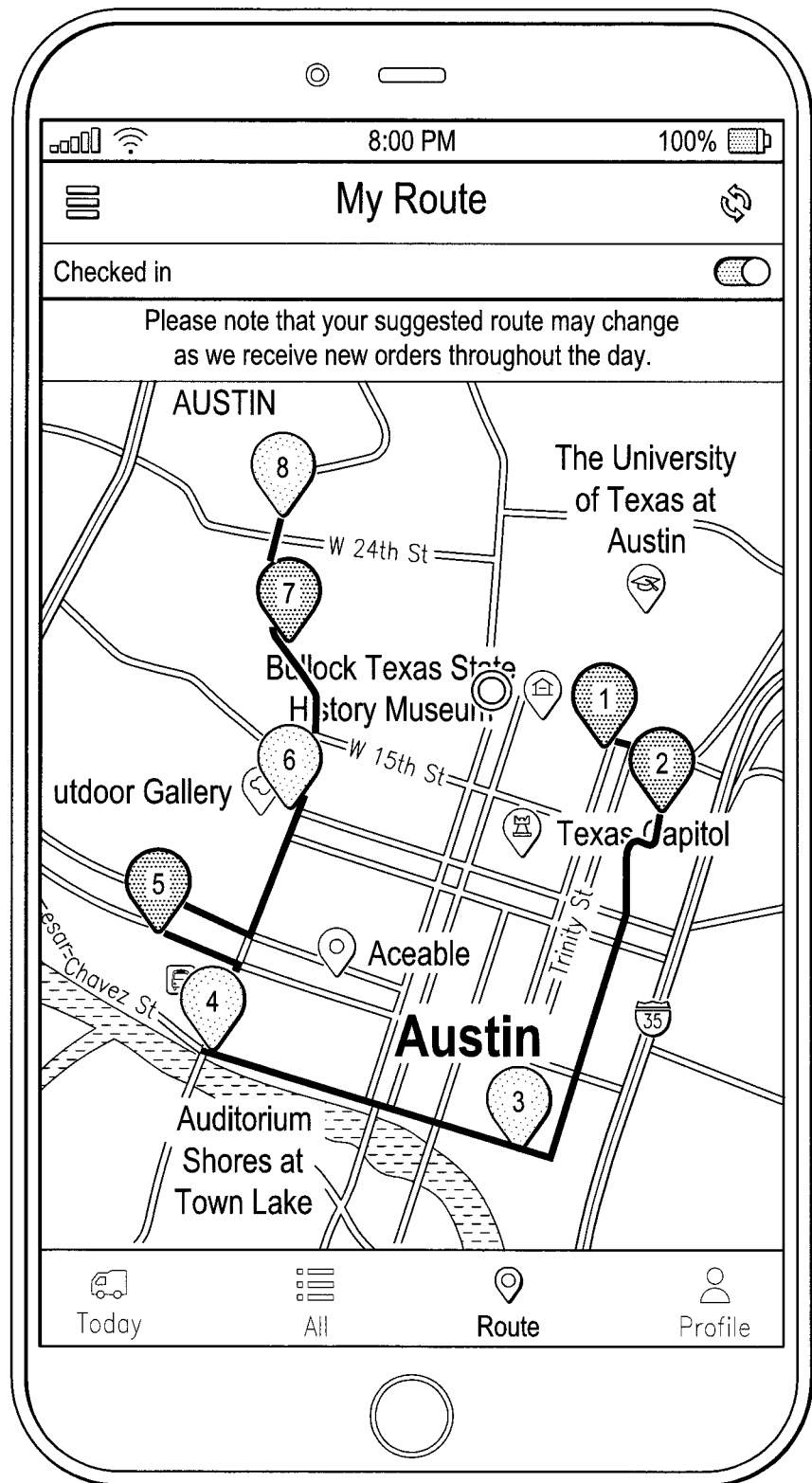

FIG. 3 is a block diagram of an embodiment of architecture for such a cloud deployed overall system that includes an embodiment of a routing system. Here, the overall system may include a number of microservices deployed in a virtual private cloud ("Dropoff VPC") in a cloud computing platform (e.g., Amazon Web Services (AWS)). An embodiment of the routing system (referred to here as the Intelligent Dispatcher or "ID") may be deployed as one or more instances of a microservice within this VPC in association with these other microservices. These other microservices may service other clients or other microservices.

The ID offers a web services interface such as a web services API such that web service requests originated from local interfaces (e.g., running on a browser on a user or driver device), a standalone application on a user or driver device, other microservices, or otherwise, may be received through a provided API. An Elastic Load Balancer (ELB) may be employed to route these incoming web services request for the ID API to an instance of the ID deployed in the VPC. Each instance of the ID may utilize a database which be a traditional relational database or a NoSQL database such as Dynamo or the like where data can be stored. Alternatively, or additionally, the ID may store manipulated or working data in another storage location such as Amazon S3 storage or the like. The ID can thus implement embodiments of the systems and methods for the automated real-time and advisory routing of orders within a fleet of geographically distributed drivers utilizing such an architecture.

Although the invention has been described with respect to specific embodiments thereof, these embodiments are merely illustrative, and not restrictive of the invention. The description herein of illustrated embodiments of the invention, including the description, is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in digital computers, by using application specific integrated circuits, programmable logic devices, field programmable gate arrays, optical, chemical, biological, quantum or nanoengineered systems, components and mechanisms may be used. The functions of the invention can be achieved using distributed or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout, the meaning of "in" includes "in" and "on" unless the context clearly dictates otherwise.

What is claimed is:

1. A system for real-time route determination and assignment of orders within a fleet of geographically distributed drivers, comprising:
    a data store including, driver data for each of a set of drivers physically distributed across a geographic area, where each of the set of drivers has a computing device adapted to determine a current location of that driver;
    a non-transitory computer readable medium comprising instructions for:
        obtaining a current location for each of the set of drivers, wherein obtaining the current location for a driver comprises receiving the current location of the driver from the computing device of that driver over an electronic communication network;
        updating the current location for each of the set of drivers in the driver data;
        receiving a new order at the system over the electronic communication network, the order comprising a pick-up location and a destination location in the geographic area;
        filtering the set of drivers to determine a reduced set of drivers by applying a filtering model trained on historical order data to the set of drivers to determine the reduced set of drivers with the highest likelihood of being a best driver for the new order, wherein the filtering model is trained by creating a first training set of historical order data by filtering a first snapshot of historical order data according to a criteria and training the filtering model using the first training set, creating a second training set of historical order data by filtering a second snapshot of historical order data according to the criteria and training the filtering model using the second training set;
        determining a burden for each driver of the reduced set of drivers, wherein determining the burden for the driver includes:
            determining a current set of orders for the driver;
            determining if a first number of locations in the current set of orders for the driver is greater than a threshold;
            determining a first total duration for the current set of orders for the driver by determining a first route for the current set of orders based on the driver's current location, wherein the first route comprises a first set of legs and is determined by an optimal routing engine when the first number of locations is less than the threshold and a non-optimal routing engine when the first number of locations is greater than the threshold;
            determining a current travel time for each of the first set of legs;
            determining the first total duration for the current set of orders based on the current travel times for each of the set of legs;
            determining a combined set of orders for the driver by adding the new order to the current set of orders for the driver;
            determining if a second number of locations in the combined set of orders for the driver is greater than the threshold;
            determining a second total duration for the combined set of orders for the driver by determining a second route for the combined set of orders based on the driver's current location, wherein the second route comprises a second set of legs and is determined by an optimal routing engine when the second number of locations is less than the threshold and a non-optimal routing engine when the second number of locations is greater than the threshold;
            determining the current travel time for each of the second set of legs;
            determining the second total duration for the combined set of orders based on the current travel times for each of the set of legs; and
            determining the burden for the new order for the driver based on the first total duration for the current set of orders and the second total duration for the combined set of orders;
        ranking the reduced set of drivers based on the burden for the new order determined for each of the reduced set of drivers; and
        assigning the new order to a highest ranking driver of the reduced set of drivers.

2. The system of claim 1, wherein the data store includes order data comprising pick-up order entries and destination order entries for received orders, each order associated with a pick-up order entry and destination order entry, and wherein the driver data for each of the set of drivers includes a list of pick-up order entries and destination order entries sorted to represent a current route determined for that driver.

3. The system of claim 2, wherein the first route is the current route.

4. The system of claim 3, wherein assigning the new order to the highest ranking driver comprises inserting a pick-up order entry and destination order entry into the list of pick-up order entries and destination order entries of the driver data for the highest ranking driver and re-sorting the list to represent the second route determined for the highest ranking driver.

5. The system of claim 1, wherein determining the current travel time for the first set of legs and the second set of legs comprises requesting the current travel time for each leg from a provider over a network.

6. The system of claim 1, wherein filtering the set of drivers to determine a reduced set of drivers comprises applying a set of filtering rules before applying the filtering model and wherein the filtering model is a recurrent neural network model trained on a set of historical snapshots of previously completed orders.

7. The system of claim 1, wherein determining the first total duration for the current set of orders comprises determining any non-transit time required at each destination of each of the set of legs of the first route and adding the determined non-transit time to the current travel times for each of the set of legs of the first route and determining the second total duration for the combined set of orders comprises determining any non-transit time required at each destination of each of the set of legs of the second route and adding the determined non-transit time to the current travel times for each of the set of legs of the second route.

8. A non-transitory computer readable medium comprising instructions for real-time route determination and assignment of orders within a fleet of geographically distributed drivers, the instructions for:
    obtaining a current location for each of a set of drivers physically distributed across a geographic area, wherein obtaining the current location for a driver comprises receiving the current location of that driver over an electronic communication network from a computing device of that driver adapted to determine the current location of that driver;
    updating the current location for each of the set of drivers in driver data stored in a data store;
    receiving a new order at the system over the electronic communication network, the order comprising a pick-up location and a destination location in the geographic area;
    filtering the set of drivers to determine a reduced set of drivers by applying a filtering model trained on historical order data to the set of drivers to determine the reduced set of drivers with the highest likelihood of being a best driver for the new order, wherein the filtering model is trained by creating a first training set of historical order data by filtering a first snapshot of historical order data according to a criteria and training the filtering model using the first training set, creating a second training set of historical order data by filtering a second snapshot of historical order data according to the criteria and training the filtering model using the second training set;
    determining a burden for each driver of the reduced set of drivers, wherein determining the burden for the driver includes:
        determining a current set of orders for the driver;
        determining if a first number of locations in the current set of orders for the driver is greater than a threshold;
        determining a first total duration for the current set of orders for the driver by determining a first route for the current set of orders based on the driver's current location, wherein the first route comprises a first set of legs and is determined by an optimal routing engine when the first number of locations is less than the threshold and a non-optimal routing engine when the first number of locations is greater than the threshold;
        determining a current travel time for each of the first set of legs;
        determining the first total duration for the current set of orders based on the current travel times for each of the set of legs;
        determining a combined set of orders for the driver by adding the new order to the current set of orders for the driver;
        determining if a second number of locations in the combined set of orders for the driver is greater than the threshold;
        determining a second total duration for the combined set of orders for the driver by determining a second route for the combined set of orders based on the driver's current location, wherein the second route comprises a second set of legs and is determined by an optimal routing engine when the second number of locations is less than the threshold and a non-optimal routing engine when the second number of locations is greater than the threshold;
        determining the current travel time for each of the second set of legs;
        determining the second total duration for the combined set of orders based on the current travel times for each of the set of legs; and
        determining the burden for the new order for the driver based on the first total duration for the current set of orders and the second total duration for the combined set of orders;
    ranking the reduced set of drivers based on the burden for the new order determined for each of the reduced set of drivers; and
    assigning the new order to a highest ranking driver of the reduced set of drivers.

9. The non-transitory computer readable medium of claim 8, wherein the data store includes order data comprising pick-up order entries and destination order entries for received orders, each order associated with a pick-up order entry and destination order entry, and wherein the driver data for each of the set of drivers includes a list of pick-up order entries and destination order entries sorted to represent a current route determined for that driver.

10. The non-transitory computer readable medium of claim 9, wherein the first route is the current route.

11. The non-transitory computer readable medium of claim 10, wherein assigning the new order to the highest ranking driver comprises inserting a pick-up order entry and destination order entry into the list of pick-up order entries and destination order entries of the driver data for the highest ranking driver and re-sorting the list to represent the second route determined for the highest ranking driver.

12. The non-transitory computer readable medium of claim 8, wherein determining the current travel time for the first set of legs and the second set of legs comprises requesting the current travel time for each leg from a provider over a network.

13. The non-transitory computer readable medium of claim 8, wherein filtering the set of drivers to determine a reduced set of drivers comprises applying a set of filtering rules before applying the filtering model and wherein the filtering model is a recurrent neural network model trained on a set of historical snapshots of previously completed orders.

14. The non-transitory computer readable medium of claim 8, wherein determining the first total duration for the current set of orders comprises determining any non-transit time required at each destination of each of the set of legs of the first route and adding the determined non-transit time to the current travel times for each of the set of legs of the first route and determining the second total duration for the combined set of orders comprises determining any non-transit time required at each destination of each of the set of legs of the second route and adding the determined non-transit time to the current travel times for each of the set of legs of the second route.

\* \* \* \* \*